United States Patent [19]

Fontana

[11] Patent Number: 4,466,067
[45] Date of Patent: Aug. 14, 1984

[54] MULTI-DETECTOR INTENSITY INTERFEROMETER AND METHOD FOR PROCESSING INCOHERENT RADIATION SIGNALS

[75] Inventor: Peter Fontana, Corvallis, Oreg.

[73] Assignee: State of Oregon, Corvallis, Oreg.

[21] Appl. No.: 250,855

[22] Filed: Apr. 3, 1981

[51] Int. Cl.³ .............................................. G01S 3/80
[52] U.S. Cl. .................................. 364/460; 343/424; 364/516; 367/125
[58] Field of Search ....................... 367/124, 125; 343/112 C, 117 A, 100 LE, 100 LL, 100 SA; 364/449, 460, 487, 516, 560, 819, 820, 841

[56] References Cited

U.S. PATENT DOCUMENTS

| | | | |
|---|---|---|---|
| 2,897,351 | 4/1959 | Melton | 343/113 R X |
| 2,976,530 | 3/1961 | Werner | 343/112 |
| 3,130,408 | 4/1964 | Kumano | 367/125 X |
| 3,134,896 | 5/1964 | Briggs | 364/487 |
| 3,157,781 | 11/1964 | Gruen | 367/125 X |
| 3,160,696 | 12/1964 | Gamo | 356/345 |
| 3,249,911 | 4/1966 | Gustafsson | 367/125 |
| 3,274,599 | 9/1966 | Page | 343/112 |
| 3,346,862 | 10/1967 | Raudsep | 343/113 |
| 3,430,243 | 2/1969 | Evans | 343/112 |
| 3,475,721 | 10/1969 | Cappel, Jr. | 367/124 |
| 3,518,415 | 6/1970 | Gutleber | 364/819 |
| 3,662,267 | 5/1972 | Reed | 455/54 |
| 3,745,518 | 7/1973 | Barret | 367/125 X |
| 3,783,445 | 1/1974 | Penwarden | 340/24 |
| 3,852,706 | 12/1974 | Barney | 367/125 X |
| 3,889,266 | 6/1975 | Bartram | 364/819 X |
| 3,947,803 | 3/1976 | Brown | 367/125 |
| 3,961,166 | 5/1976 | Stobart | 364/450 |
| 4,074,266 | 2/1978 | Yokoi et al. | 343/100 SA |
| 4,196,473 | 4/1980 | Chea | 364/449 |
| 4,198,704 | 4/1980 | Munson | 367/125 |
| 4,223,311 | 9/1980 | Ellingson | 367/125 X |

OTHER PUBLICATIONS

Goff, K. W., "An Analog Electronic Correlator for Acoustic Measurements" in *The Journal of the Acoustical Society of America*, vol. 27, No. 2, (Mar. 1955), pp. 223–236.

"Apparent Angular Sizes of Discrete Radio Sources", *Nature*, vol. 170, No. 4338, (Dec. 1952), pp. 1061–1065.

Gamo, H. "Triple Correlator of Photoelectric Fluctuations as a Spectroscopic Tool", *Journal of Applied Physics*, vol. 34, No. 4, (Apr. 1963), pp. 875–876.

Sato, T., Wadaka, S., Yamamoto, J., and Ishii, J., "Imaging System Using an Intensity Triple Correlator", *Applied Optics*, vol. 17, No. 13, (Jul. 1978), pp. 2047–2052.

Hanbury Brown, *Nature*, 1956, vol. 177, pp. 27–29, "Correlation Between Photons in Two Coherent Beams of Light".

Sato, T., Ishii, J., and Wadaka, S., "Computer Controlled Image Sensor and its Application", *Applied Optics*, vol. 18, No. 4, (Feb. 1979), pp. 485–488.

Beard, T. D., "Imaging by Correlation of Intensity Fluctuations", *Applied Physics Letters*, vol. 15, No. 7, (Oct. 1969), pp. 227–229.

Hanbury Brown, R., "The Stellar Interferometer at Narrabri, Australia", *Philips Technical Review*, vol. 27, No. 6, (1966), pp. 141–159.

Hanbury Brown, R., and Twiss, R. Q., "A New Type of Interferometer for Use in Radio Astronomy", *Philosophical Magazine*, vol. 45, No. 366, (Jul. 1954), pp. 663–682.

*Primary Examiner*—Errol A. Krass
*Attorney, Agent, or Firm*—Klarquist, Sparkman, Campbell, Leich & Whinston

[57] ABSTRACT

A multi-detector intensity interferometer includes plural radiation detectors positioned in a predetermined geometric array. Incoherent radiation signals from a body are received by the respective detectors, time-delayed relative to one another, and the time-delayed signals are fed to a multiplier circuit. The multiplier circuit produces an output signal comprising the product of the time-delayed signals from each of the detectors. This output signal is then integrated by an integrator circuit. A significant output signal is produced by the integrator circuit only when the time-delays of the respective detected signals correspond to the location of the object relative to a reference location. In a preferred embodiment employing at least four such detectors, the three-dimensional coordinates of the body relative to a reference coordinate system can be determined from the time-delays. Also, in this preferred embodiment, the multiplier circuit includes respective multipliers for combining two of the time-delayed signals, three of the time-delayed signals and four of the time-delayed signals. These combined signals are then fed to respective integrators to provide additional information concerning the location of the body. Also, a preferred embodiment of a three-detector intensity interferometer is disclosed, for more limited applications. In addition, the apparatus may operate as both a passive system, receiving incoherent signals generated by a body or source, and as an active system in which radiation is scattered from the body and the scattered radiation is detected.

28 Claims, 13 Drawing Figures

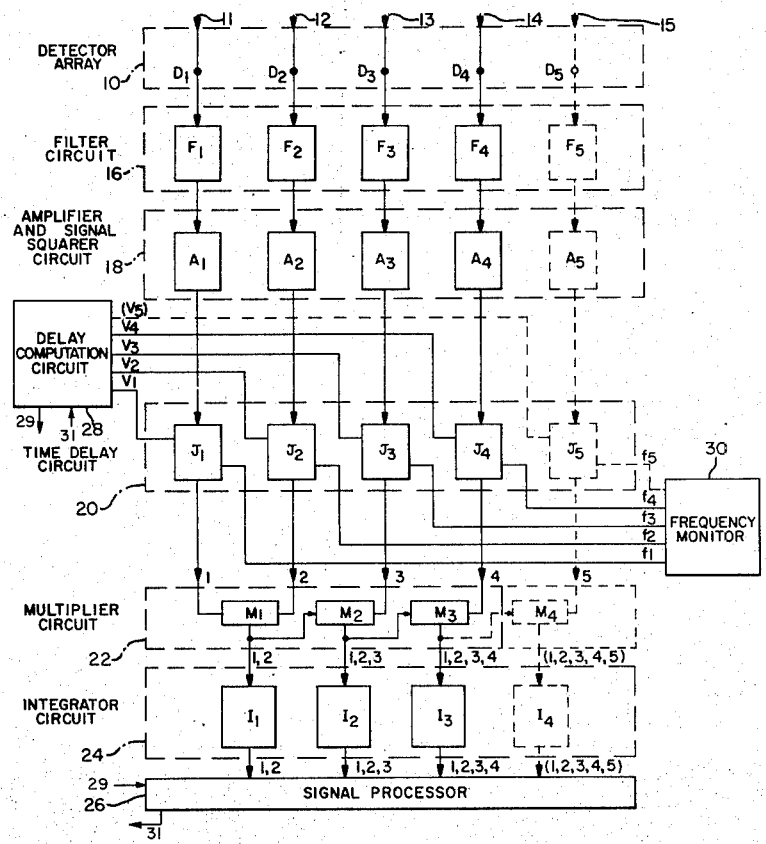

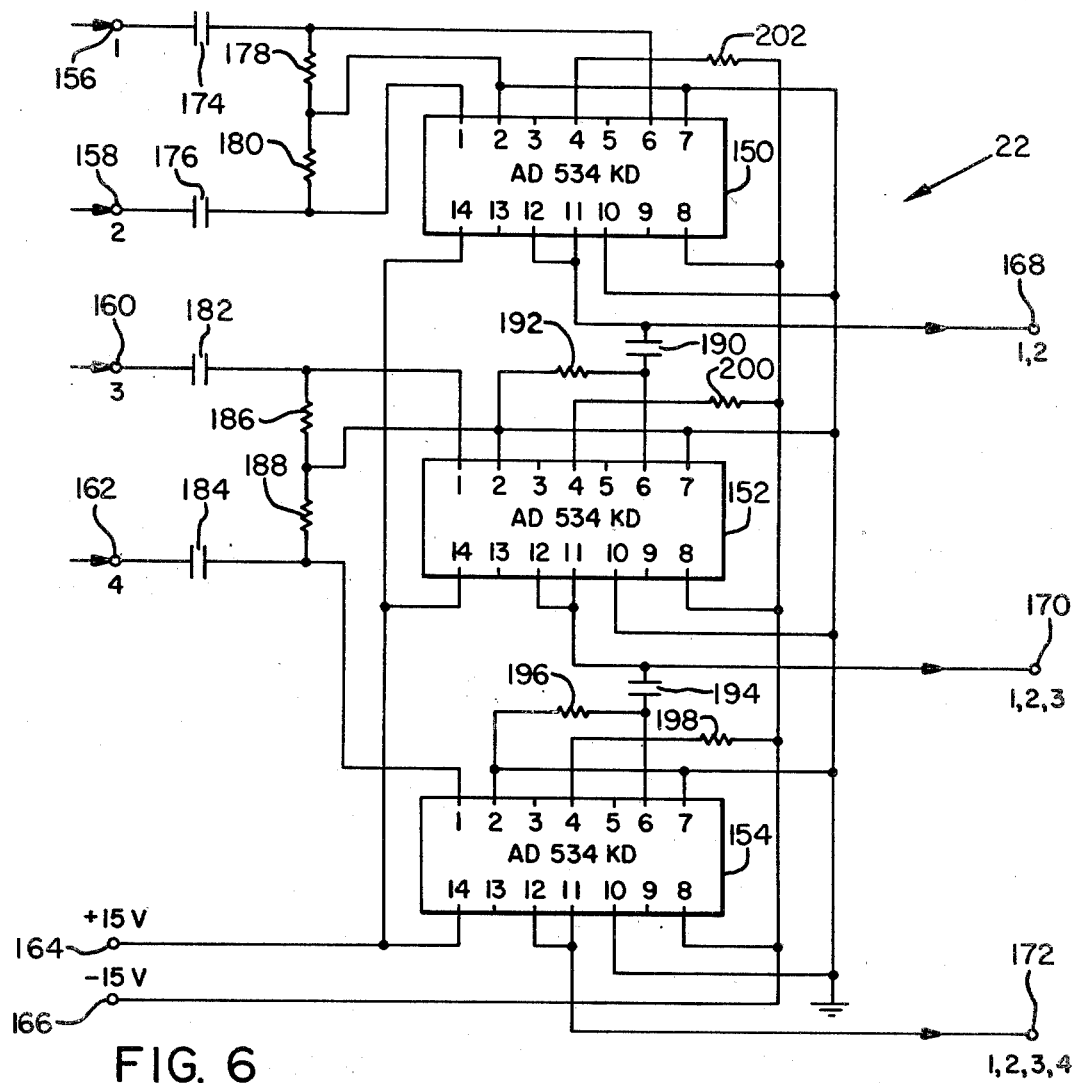
FIG. 6
FIG. 13
FIG. 7
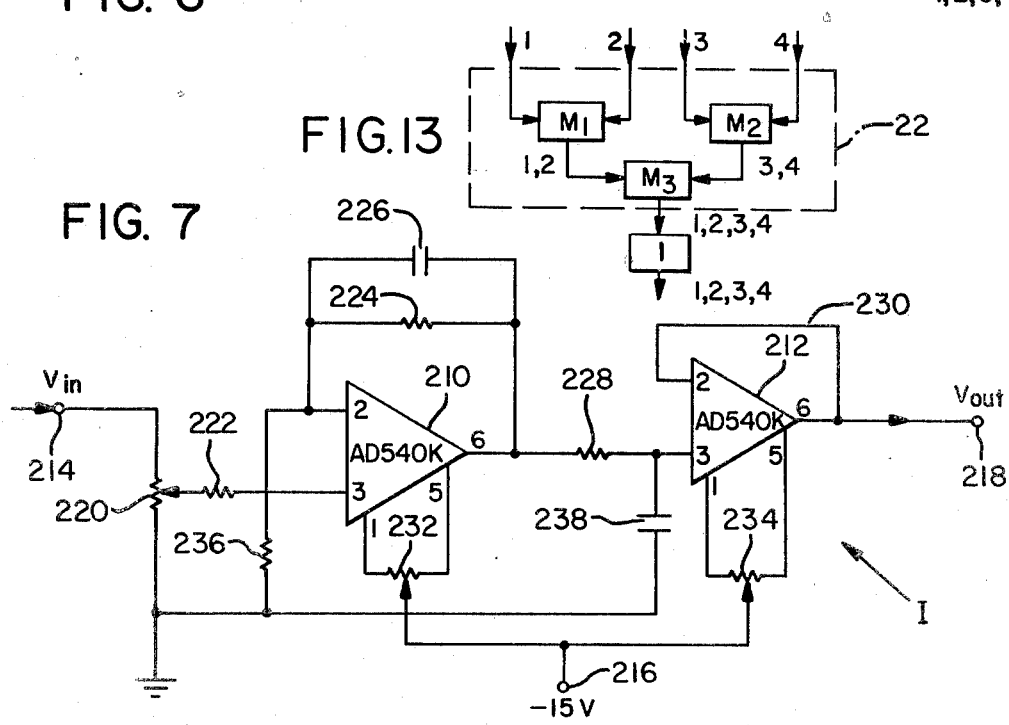

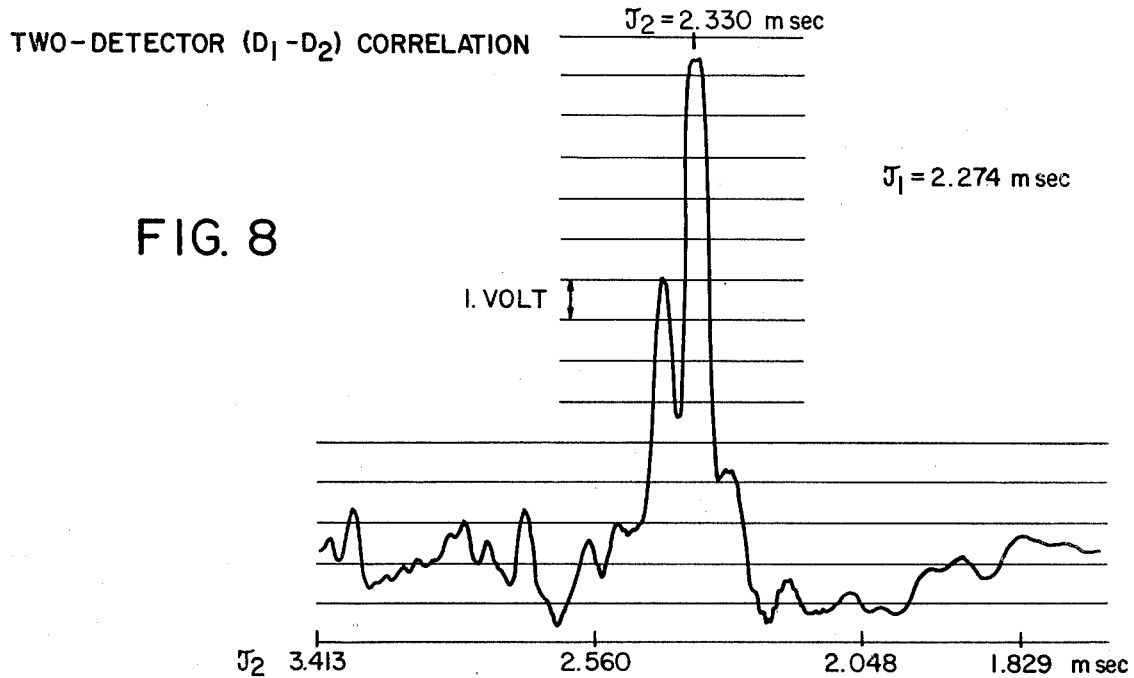

MULTI-DETECTOR INTENSITY INTERFEROMETER AND METHOD FOR PROCESSING INCOHERENT RADIATION SIGNALS

BACKGROUND OF THE INVENTION

This invention relates to a multi-detector intensity interferometer method and apparatus for receiving incoherent radiation from a body and processing such radiation to determine information, such as the location of the body relative to a reference location, therefrom.

It has been recognized that incoherent radiation emanating from a body contains a spectrum of frequencies with random phase changes. Such radiation has been previously analyzed for selected puposes, but is not known to have been utilized to locate the three-dimensional coordinates of the body relative to a reference coordinate system.

An early device for analyzing such radiation is disclosed in *Nature,* Volume 170, page 1061, published in 1952, in which an intensity interferometer is used for the limited purpose of measuring the angular diameter of discreet radio sources. This device employed two radiation intensity detectors which produced outputs that were multiplied and the result integrated. The signals received at the two detectors were delayed relative to one another by varying the separation of the detectors.

A later apparatus was suggested by Gamo in an article entitled "Triple Correlator of Photoelectric Fluctuations as a Spectroscopic Tool" published in 1963 in the Journal of Applied Physics, Volume 34, No. 4. In this device, three signals were processed for use in analyzing asymmetrical spectrum profiles of laser beams. More specifically, a collimated beam of laser light was divided by two beam splitters into three signals which were then detected by three respective photodetectors. Two of the detected signals were then time-delayed and the signals were multiplied together, integrated and recorded for processing. Sato, et al, expanded this work in an article published in 1978 in *Applied Optics,* Volume 17, at page 2047. More specifically, in Sato, quasi-incoherent light was obtained by passing light from an he-ne laser through a rotating ground glass diffuser. The defracted light was then passed through a lens, a half mirror, a prism and detected. By measuring the magnitude and phase of the correlation functions, Sato reconstructed the image of a two-dimensional object from the detected signals.

Also, as exemplified by U.S. Pat. No. 3,346,862 of Raudsep, two radiation detectors have previously been used to receive signals from a radiation source. The received signals are processed and utilized to determine the angular position of the source with reference to the perpendicular bisector of a line containing the two detectors. In Raudsep, the two received signals are understood to have been passed through a weighting filter as part of the signal processing. This filter is designed to modify the received signals so that, after they are time-delayed and multiplied together, side peaks in an auto correlation function associated with the signals are minimized. Raudsep does incidentally mention that his receivers can be antennas or any other type of detectors. Also, without explaining how, Raudsep also mentions the use of triangulation techniques and the combining of outputs of pairs of detectors to obtain range information, in addition to information on the angular position of the source. Thus, Raudsep is understood to disclose an apparatus which analyzes radiation to determine limited range and bearing information concerning a source of radiation.

Another device for determining the range and bearing of a signal source is disclosed in U.S. Pat. No. 3,947,803 of Brown. In Brown, three spaced-apart amplitude sensitive hydrophones receive signals from a source. These signals are compared two at a time in respective circuits. Each such circuit includes a time-delay for delaying one of the two compared signals, a multiplier for multiplying the time-delayed signals with the non-time-delayed signals, and an integrator for integrating the multiplied output signal. A computer is then utilized to determine the range and bearing of the source based upon the results of the comparison. However, Brown is understood to process amplitude representations of the received signals and not intensity representations thereof. Furthermore, Brown integrates the product of only two signals at a time thereby limiting the information available from the signals.

A further device similar to Brown, is disclosed in U.S. Pat. No. 3,249,911 of Gustafsson, in which three amplitude detectors are positioned in a plane. In Gustafsson, the product of time-delayed respective first and second signals from two of the detectors is obtained. This product signal is then filtered, as by a low pass filter or integrator, to produce an output which is maximum if the two detected signals are coherent. In addition, the second signal and a third signal from the remaining detector are also respectively time-delayed, multiplied, and filtered to produce another output which is maximum if these latter two signals are coherent. Furthermore, two signals consisting of the product of the first and second signals and the product of the second and third signals are multiplied and filtered to produce a third filtered output signal. This third filtered output signal, according to Gustafsson, is non-zero only if the first, second and third detected signals are from the same signal source. Thus, according to Gustafsson, his device is capable of determining the position of a source in a two-dimensional plane. In addition, he mentions the possible use of more than three detector stations for over-determination of the two-dimensional location. However, Gustafsson is also understood to process amplitudes of detected signals and not intensities thereof. Furthermore, Gustafsson does not suggest determination of the three-dimensional corrdinates of a source of coherent radiation. For that matter, Gustafsson, as understood, is incapable of determining the three-dimensional location of a source. That is, a source can be at any point on the line of intersection of two hyperbolas, and not necessarily in the plane of the Gustafsson detectors, and Gustafsson cannot determine the location of the source along this line.

As an example of still another prior device, consider U.S. Pat. No. 3,430,243 of Evans. In Evans, a four detector device is disclosed for determining the distance or range between objects and the relative bearing and elevation angles therebetween. More specifically, Evans illustrates three detectors on an aircraft, positioned in an equilateral triangle, together with a fourth detector disposed in a line perpendicular to the plane containing the three detectors and which intersects one of the three detectors. Evans employs ratio determining circuits for comparing the ratio of the intensities of detected signals and circuitry for utilizing these ratios to determine the desired range and bearing information.

Thus, Evans operates on an entirely different principle for determining limited information concerning the location of a signal source.

Therefore, a need exists for an apparatus and method for analyzing the intensity of incoherent radiation received from a body for the purpose of more accurately determining the location of the body relative to a reference location. Also, a need exists for an apparatus and method for more effectively processing such received radiation for a variety of purposes.

SUMMARY OF THE INVENTION

In its broadest aspect, the invention relates to a method and apparatus for processing signals representing the intensity of incoherent radiation from a body which is received at plural spaced-apart locations to, for example, enable the more accurate determination of the location of the body relative to a reference location.

More specifically, an array of multiple detector means are arranged in a predetermined geometric relationship and receive incoherent radiation emanating from a body. This received radiation may be generated by the body itself, or be from another source and reflected from the body. The detector output signals are time-delayed relative to one another and the delayed signals are multiplied together within a multiplier circuit means. Thereafter, the multiplied signals are integrated. A significant integrator output signal is produced when the detector or output signals have been delayed an amount of time to correspond to the location of the body. The time-delays resulting in the significant integrator output signal may then be processed to provide information concerning the body, such as its location relative to the location of the detectors.

The apparatus and method of the present invention analyzes intensity representatives of the detected signals and not their amplitudes. Signals representing the intensity of the incoherent radiation impinging upon the detectors may be obtained in any manner, such as by squaring signals representing the received radiation prior to integration. This may be accomplished, for example, by a signal squarer circuit associated with each of the detectors or by using square law detectors.

Also, in a preferred embodiment of the invention, at least four such detectors are utilized to receive radiation from a body. In addition, the multiplier circuit means contains at least one multiplier which produces an output signal comprising the product of four respective time-delayed signals corresponding to the respective time-shifted four detector output signals. It has been discovered that, when such a multiplier output signal is integrated, a significant integrator output signal is obtained for only one set of relative delay times of the detector output signals. Furthermore, the set of relative delay times which produce the integrator output signal can be used to compute the three-dimensional coordinates of the body relative to a reference coordinate system which is established by the geometric arrangement of the detectors.

Also, as a more specific feature, this preferred embodiment includes a means for scanning the various possible locations of the body relative to the reference coordinate system. This is accomplished by varying the delay times of the detected signals relative to one another until the set of time-delays is determined which results in a significant integrator output signal.

As still another feature of this preferred embodiment of the invention, plural multipliers and integrators are utilized. A first such multiplier produces an output representing the product of the time-delayed signals from the first and second detectors, which is then integrated by the first integrator. The first integrator produces a significant output signal only when the relative delay times of the first and second detector output signals are such that the signals are correlated. These delay times provide more specific information concerning the direction of the source with respect to a line containing the first and second detectors. In addition, a second such multiplier produces an output comprising the product of the time-delayed signals from the first, second and third detectors which is then integrated by a second integrator. This second integrator produces a significant output signal only when the delay times of the first, second and third detector output signals are such that these three signals are correlated. The time-delays provide more specific information concerning the location of the body relative to the reference location. Also, these delay times provide an indication of the coordinates of the body in the event the body is in a plane containing the first three detectors. In addition, a third such multiplier and integrator as described above, is used to determine a set of four delay times which correlates four detector output signals. These latter delay times are, usable to locate the three-dimensional coordinates of the body. Additional detectors and associated circuitry may also be added to provide an over-determination of the location of the body. Information from such added detectors is usable to confirm and verify the three-dimensional coordinates determined by a four detector apparatus.

As a further feature of the preferred embodiment of the invention, particularly for acoustic radiation frequency ranges, electronic time-delay circuit means are used for delaying the respective output signals from the detectors and for varying the delay times for scanning purposes. Such electronic delay means may be voltage controlled and may include control voltage monitoring means for electronically computing the delay times from the control voltage. Such means may also be frequency controlled and include frequency monitoring means for electronically computing the delay times from the control frequency.

As an optional and more specific feature of the invention, the detectors may comprise amplitude detectors, such as microphones. In this regard, an amplifier and signal squarer circuit may be associated with each detector for amplifying and squaring the detector output signal to produce an amplified intensity representation of the detected radiation.

As still another optional feature of the invention, frequency filters may be provided for limiting the bandwidth of the received signals to, in certain applications, facilitate processing of the signals.

In addition, a signal processing circuit may also be provided which may comprise a chart recorder, oscilloscope, or digital computer for recording and processing the significant integrator output signals.

In an alternate embodiment of the invention, sets of plural fixed time-delay circuits, multipliers and integrators are employed. Each set is associated with a particular three-dimensional point of a grid relative to the reference coordinate system. Hence, when a body is located at a grid point corresponding to one set of time-delays, only the integrator associated with such set produces a significant output signal. This in turn identifies the associated time-delays from which the three-dimensional location of the body can be computed.

A virtually unlimited arrangement of geometries may be utilized for the detectors. However, certain geometries facilitate the computations of coordinates of the body. In one preferred geometry, four detectors are located in a common plane, with three of the detectors at the vertices of an equilateral triangle and the fourth detector at the center of the triangle. In another preferred geometry, four detectors are located at the corners of a rectangle.

A three-detector embodiment of the invention is also disclosed for obtaining more limited information concerning the location of a body.

Also, a beam of collimated radiation may be scattered from a body and the scattered radiation detected.

It is accordingly one object of the invention to provide an improved method and apparatus for more accurately determining the location of a body relative to a reference location.

It is still another object of the invention to provide an improved method and apparatus for receiving incoherent radiation from a body and processing the received radiation to provide information concerning the body.

It is a further object of the invention to provide an improved apparatus and method for determining the location of a body which is itself generating incoherent radiation or which is scattering incoherent radiation from another source.

A further object of the invention is to provide a method and apparatus for determining the three-dimensional coordinates of a body based on intensity fluctuations of radiation received from the body at at least four geometrically spaced locations.

Still another object of the invention is to locate the three dimensional coordinates of a body separately from adjacent bodies which are also emitting radiation.

A more specific object of the invention is to provide an apparatus and method for more reliably and accurately determining the location of a body from incoherent radiation emanating therefrom, and without pre-existing information concerning the location of the body.

These and other objects, features and advantages of the invention will become more apparent with reference to the following drawings and description.

BRIEF DESCRIPTION OF THE DRAWINGS

FIG. 6 is a circuit diagram of one form of multiplier circuit utilized in FIG. 1;

FIG. 7 is a circuit diagram of one form of integrator circuit utilized in FIG. 1;

FIG. 8 illustrates an integrator output signal from the multiplier $M_1$ of FIG. 1, with the time delays $\tau_1$ and $\tau_2$ adjusted to correlate the signals from detectors $D_1$ and $D_2$.

FIG. 9 illustrates an integrator output signal from the multiplier $M_2$ of FIG. 1, with the time delays $\tau_1$, $\rho_2$, and $\tau_3$ adjusted to correlate the signals from detectors $D_1$, $D_2$ and $D_3$.

FIG. 10 illustrates an integrator output signal from the multiplier $M_3$ of FIG. 1, with the time delays $\tau_1$, $\tau_2$, $\tau_3$, and $\tau_4$ adjusted to correlate the signals at the detectors $D_1$, $D_2$, $D_3$ and $D_4$;

FIG. 13 represents an alternate form of multiplier circuit suitable for use in the circuit of FIG. 1.

THEORY OF MULTI-DETECTOR INTENSITY INTERFEROMETER

Figure 1:
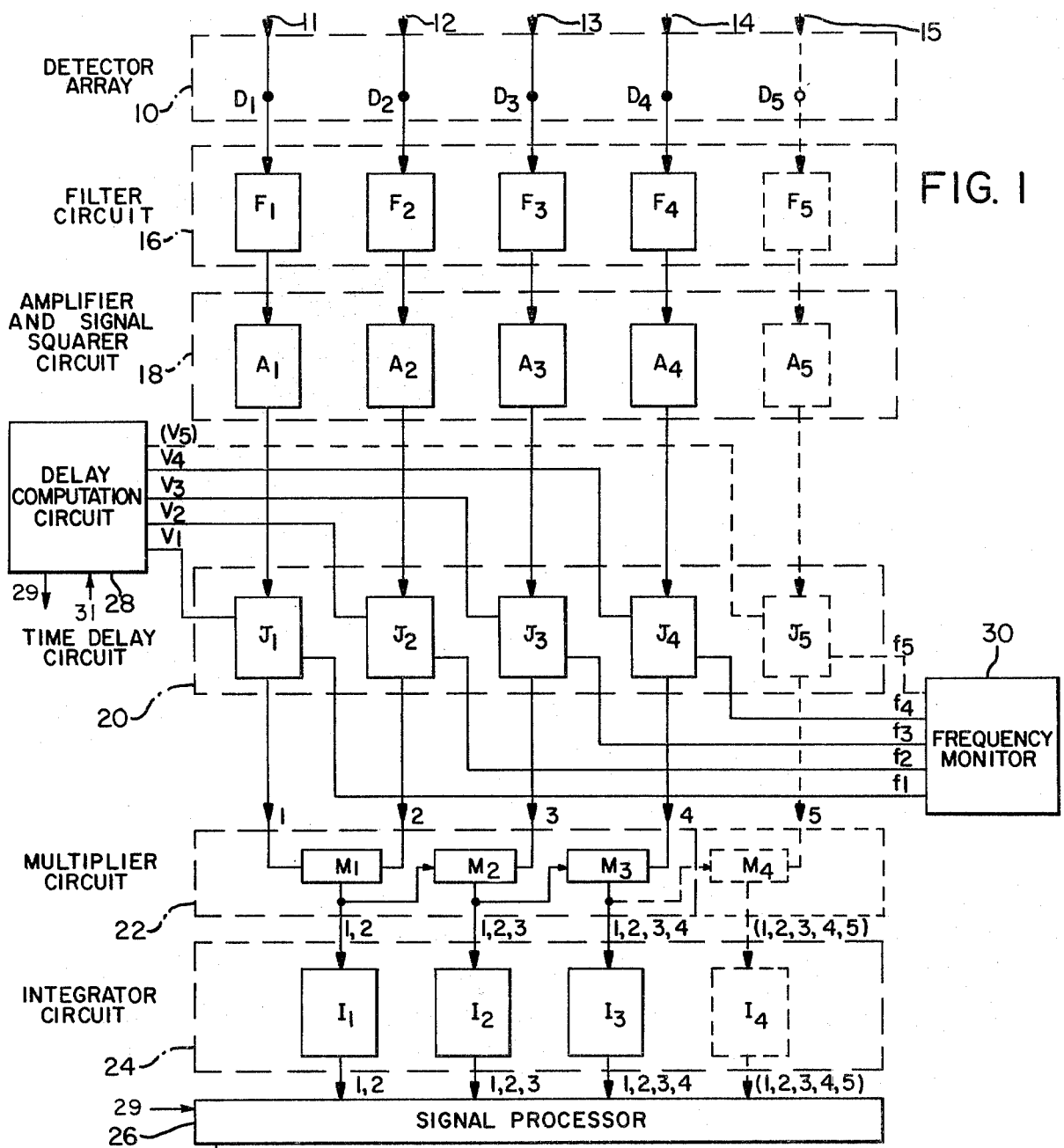
FIG. 1 is a block diagram of one preferred embodiment of the invention.

It has been learned that intensity fluctuations of incoherent radiation emanating from a body can be utilized to determine the location of the body with respect to a coordinate system. Furthermore, that with a given geometric array of at least four detectors, it has been learned that by delaying signals from the detectors relative to one another, multiplying the delayed signals and integrating the result, a significant integrator output signal is produced only when one set of relative time-delays of the detector output signal is employed. From this set of time-delays, the three-dimensional coordinates of the body relative to a reference coordinate system, established by the geometry of the detectors, can be determined. This is based upon the principle that, for a given geometry of detectors, there is a one-to-one correspondence between the set of time-delays which result in the significant integrator output and the location of the body.

Consider a distributed source of incoherent radiation and label each source point with the index j. The time dependence of the disturbance from the j-th source point can be written as:

$$E_j(t) = \frac{1}{2\pi} \int_{-\infty}^{\infty} f_j(\omega) e^{-i\omega t} d\omega \qquad (1)$$

For incoherent radiation the Fourier transform $f_j(\omega)$ contains random phase fluctuations. In order to be able to follow these fluctuations, one can define $$f_j(\omega) = |f_j(\omega)| e^{i\phi_j(\omega)} \qquad (2)$$

where $\phi_j(\omega)$ is the phase of the component with frequency $\omega$ and $|f_j(\omega)|$ is the amplitude spectrum of the distribution.

The time delayed current from the k-th detector is given by the expression $$I_k(t) = \frac{\sigma_k}{2\pi} \sum_j \int_{-\infty}^{\infty} \left[ \int_{-\infty}^{\infty} f_j(\omega_k) f_j(\alpha_k - \right. \qquad (3)$$

-continued $$\omega_k)d\omega_k \Big] e^{i\omega k(t_{jk}+\tau_k)}e^{-i\alpha_k t}d\alpha_k$$

where $t_{jk}$ is the transit time from the source to the detector and $\tau_k$ is the time delay. The constant $\sigma_k$ contains terms representing the efficiency of the k-th detector and the effects of any amplifier and squarer circuit which is employed. Also, the influence of a filter circuit, if used, is reflected in the distribution $|f_j(\omega)|$. The output of the integrator is given by:

$$I(\tau_1, \tau_2, \ldots \tau_n) = \int_{-\infty}^{\infty} I_1(t)I_2(t) \ldots I_n(t)dt \quad (4)$$

In practical circuitry, integration time limits are finite. However, as long as the actual integration time is long compared to the characteristic time of the phase fluctuations of the radiation, one can, in effect, extend the integration limits to $\pm\infty$. The phase fluctuations produce a characteristic code which is used to determine the location of radiation sources. The code is established by finding certain frequencies which in Eq. (4) produce a stable phase relationship. There are different relationships for different numbers of detectors. For a four detector intensity interferometer, there are eight different frequencies in the integrand of Eq. (4). The integration over time leaves seven frequencies independent of each other. The frequencies are correlated when:

$$\phi_j(\omega_1)+\phi_j(\alpha_1-\omega_1)+\phi_j(\omega_2)+\phi_j(\alpha_2-\omega_2) \\ +\phi_j(\omega_3)+\phi_j(\alpha_3-\omega_3)+\phi_j(\omega_4) \\ +\phi_j(-\alpha_1-\alpha_2-\alpha_3-\omega_4)=0 \quad (5)$$

There are a total of 48 sets of frequency relationships which satisfy Eq. (5). For these sets the integrator can produce a signal. The result is most conveniently expressed in terms of the first order correlation function:

$$g_j(\tau) = \int_{-\infty}^{\infty} |f_j(\omega)|^2 e^{-i\omega\tau}d\omega \quad (6)$$

The output of the integrator is written in terms of products of four first order correlation functions with different transit times $t_{jk}$ and delay times $\tau_k$. The output from the integrator of the intensity interferometer is a maximum when the conditions $t_{j1}+\tau_1=t_{j2}+\tau_2=t_{j3}+\tau_3=t_{j4}+\tau_4$ are satisfied.

Thus, from (1) the measured set of three delays $\tau_1, \tau_2, \tau_3$, and $\tau_4$ which maximize this integrator output signal, and (2) a geometrical constraint condition among the transit times $t_1, t_2, t_3,$ and $t_4$ established by the geometry of detectors, one can determine the three-dimensional coordinates of the source points.

For a three-detector intensity interferometer there are eight frequency relationships which are responsible for a signal at the output of the integrator. They are different from those needed in the four-detector intensity interferometer and require a completely separate analysis. In contrast a two-detector intensity interferometer only has two kinds of correlated frequency relationships.

A multi-detector intensity interferometer may also be utilized to determine the frequency distribution of radiation from a point source.

In such an application, the output of the integrators is proportional to products of first order correlation functions $g(\tau)$ of the radiation. In particular:

$$I(1, 2) \alpha g(T_1 - T_2)g(T_2 - T_1)$$

$$I(1, 2, 3) \alpha g(T_1 - T_2)g(T_2 - T_3)g(T_3 - T_1)$$

$$I(1, 2, 3, 4) \alpha g(T_1 - T_2)g(T_2 - T_3)g(T_3 - T_4)g(T_4 - T_1) +$$

$$g(T_1 - T_3)g(T_3 - T_2)g(T_2 - T_4)g(T_4 - T_1) +$$

$$g(T_1 - T_3)g(T_3 - T_4)g(T_4 - T_2)g(T_2 - T_1)$$

where $T_i = \tau_i + t_i$, $t_i$ is equal to the transit time from a radiation source to a detector, and $i=1,2,3,4$ for a four-detector system.

From the measurements of time-delays $\tau_i$, one can determine $g(\tau)$. The first order correlation function is related to the spectrum $U(\omega)$ of the radiation by the equation;

$$U(\omega) = \frac{1}{2\pi} \int_{-\infty}^{\infty} g(\tau)e^{(i\omega\tau)}d\tau \quad (7)$$

The mathematical limits of the integral are from $-\infty$ to $+\infty$. In practice, a good approximation of the spectrum is obtained with relatively small limits. Hence, the apparatus has applications in analysis of the spectrum of the radiation from the source.

From an ideal standpoint, the above analysis assumes that the body is stationary during detection and processing of the signals, this in turn renders the radiation stationary such that averages over time are independent of the starting time of the radiation and only depend upon the time taken by the radiation to travel from the body to the detectors. In the event the body is moving, faster scanning minimizes inaccuracies otherwise resulting therefrom. Also, as explained more fully below, plural sets of time-delay circuits can be employed to eliminate scanning entirely.

Also, incoherent radiation from a body has a finite coherence time which may be expressed as $\Delta t = (\lambda_0^2)/(c\Delta\lambda)$; wherein $\lambda_0$ is equal to the mean wave length of the radiation; c is equal to the speed of propogation of the radiation; and $\Delta\lambda$ is equal to the bandwidth of the radiation. The resolution of the apparatus, the ability to separate the location of nearby sources of radiation, is on the order of the coherence length of the radiation which may be expressed as $\Delta l = c\Delta t$. This capacity of the apparatus to determine the location of one source of radiation from a field of plural sources is important. In the event the coherence time is shorter than the resolution time of available detectors, then frequency filters may be placed ahead of the input to the detectors to thereby decrease the bandwidth and increase the coherence time.

Because of these relationships, the apparatus functions more accurately the greater the incoherent nature of the radiation received from the body. As the cohereny of the radiation increases, the apparatus becomes less capable of identifying the location of individual sources of radiation. Also, it is important to have an integration time of sufficient length to enable the identification of the random code of fluctuations associated with the radiation.

It should also be noted that ideal intensity detectors have outputs which are directly related to the instantaneous intensity of detected radiation. However, practical detectors have outputs which are proportional to the average value of the intensity of detected radiation over a short interval of time, which comprises the resolution time of the detectors.

Hence, combining these reveals that the accuracy of the apparatus depends upon the coherence time of radiation emanating from the body, the resolution time of the detectors and the existence of a sufficient integration time.

It should also be noted that, if the distance from the body to the detector is much greater than the separation of the detectors, then the apparatus becomes less accurate in determining range of the body. However, it is still sensitive to angular changes in the location of the body.

DETAILED DESCRIPTION OF PREFERRED EMBODIMENTS OVERALL DESCRIPTION

One primary purpose of the apparatus and method is to determine the position of a body from which incoherent radiation is emanating, relative to a reference position. The system may be passive. That is, it merely receives incoherent radiation generated by the body itself, such as the sound generated by the engine of an airplane or other vehicle. Alternately, the system may be active, with the body being a target from which radiation is reflected and then detected by the system.

The detailed description which follows refers to a specific preferred embodiment operable in the acoustic frequency range, which may be defined to include sonic and ultrasonic signals ranging from approximately ten hertz to one megahertz. The system is also operable in electromagnetic frequency ranges as well, including radio, infrared, visible light, X-rays, gamma radiation, and so forth. Hence, the apparatus and method is not limited to a particular frequency range.

The apparatus of FIG. 1 includes a detector array 10 including radiation detectors $D_1$ through $D_5$. These detectors have respective inputs 11 through 15 which receive incoherent radiation emanating from a body. Detectors $D_1$ through $D_4$ are shown in solid lines as at least four such detectors arranged in a predetermined geometric relationship are required to determine the three-dimensional coordinates of a body relative to a reference coordinate system established by the detector array. Such a system, subject to resolution capabilities of components, is capable of identifying and distinguishing location of a body emanating radiation from nearby bodies which also emanate radiation. Also, for an extended body, information on the coordinates of various parts of the body can also be obtained. Additional detectors, such as $D_5$ shown in dashed lines, may be added in the manner of detector $D_5$. Such additional detectors provide additional data for verifying the results obtained from processing the signals from the four detectors $D_1$ through $D_5$.

The output of the detectors are fed to inputs of an optional filter circuit 16, and more specifically each detection output is fed to respective inputs of bandwidth limiting filters $F_1$ through $F_5$ of filter circuit 16. These filters limit the frequency bandwidth of the output signals from detectors $D_1$ through $D_5$ ao that, particularly in high frequency applications, the circuitry is simplified and processing of the signals is facilitated. However, in general, the broader the bandwidth of the detected signals the more accurate the determination of the location of the body relative to the reference coordinate system. Hence, filter circuit 16 is typically eliminated as it reduces the accuracy of the determination of the location of the body.

The outputs of the respective frequency filters $F_1$ through $F_5$ are fed to respective inputs of amplifier and signal squarer circuits $A_1$ through $A_5$ of an amplifier squarer circuit 18. The system operates by integrating signals representing the intensities of the radiation received by the detectors. Hence, it is necessary that these signals be converted from amplitude representations of the detected radiation, in cases where the detectors are microphones or other amplitude detectors to intensity representations of the detected radiation. One way of accomplishing this conversion is to square the signals from the detectors at some point in the circuitry prior to integration. Conveniently, this squaring takes place in amplifier squarer circuit 18. Of course, when square law detectors are utilized, intensity representations of the detected signals are directly obtained and a squaring circuit is unnecessary.

The amplified signals from the respective amplifiers $A_1$ through $A_5$ are transmitted to respective signal delay circuits $\tau_1$ through $\tau_5$, of a time-delay circuit 20. These time-delay circuits are operable to delay the received signals respective delay times $\tau_1$ through $\tau_5$ to thereby time-shift the signals from detectors $D_1$ through $D_5$ relative to one another.

The outputs of respective time-delay circuits $\tau_1$ through $\tau_5$ are fed to respective inputs 1 through 5 of a multiplier circuit 22. In the illustrated embodiment, multiplier circuit 22 includes four individual two-input multipliers $M_1$ through $M_4$. The output signal from multiplier $M_1$ corresponds to the product of the signals detected at detectors $D_1$ and $D_2$. Similarly, the output signal from multiplier $M_2$ corresponds to the product of signals detected at detectors $D_1$, $D_2$ (from multplier $M_1$) and $D_3$. In the same manner, multiplier $M_3$ produces an output corresponding to the product of signals detected at detectors $D_1$, $D_2$ and $D_3$ (from multiplier $M_2$) and $D_4$. In addition, multiplier $M_4$ provides an output corresponding to the products of signals detected at detectors $D_1$ through $D_5$.

The output signals from multipliers $M_1$ through $M_4$ are integrated by respective integrators $I_1$ through $I_4$ of an integrator circuit 24 and fed to a signal processor circuit 26. Integrator $I_1$ produces a significant output to the signal processor only then the delay times $\tau_1$ and $\tau_2$ have been suitably adjusted to correlate the signals at detectors $D_1$ and $D_2$. This output provides broad information concerning the location of the body. In the same manner, integrator $I_2$ produces a significant output signal only when the delay times $\tau_1$, $\tau_2$, and $\tau_3$ have been adjusted to correlate the signals at detectors $D_1$, $D_2$ and $D_3$. These time-delays define further the region of space in which the body is located. Also, integrator $I_3$ produces a significant output only when the delay times $\tau_1$, $\tau_2$, $\tau_3$ and $\tau_4$ have been adjusted to correlate the signals detected by detectors $D_1$ through $D_4$. When so adjusted, these delay times are in a one-to-one relationship with the location of the body relative to the detectors and can be used to compute the three-dimensional coordinates of the body. Furthermore, a significant output at integrator $I_4$ confirms the determination of the location of the body from the delay times which produce an output from integrator $I_3$, thereby overdetermining the location of the body.

Signal processor 26 may comprise any suitable processing circuit such as a multichannel chart recorder for recording the outputs from the integrators, $I_1$, $I_2$, $I_3$, and $I_4$. The presence of outputs from the integrators, together with knowledge of the delay times $\tau_1$, $\tau_2$, $\tau_3$, $\tau_4$, $\tau_5$, which resulted in the integrator outputs enables the computation of the coordinates of the source from the geometry of the detectors, as explained more fully below. As other examples, and without limiting the wide range of suitable circuits, signal processing circuit 26 may comprise an oscilloscope or a digital computer programmed in a straight forward manner to compute and print out the coordinates of the source from the delay times which resulted in the integrator output signals.

Also, in the acoustic range, it is frequently more convenient to utilize electronic time-delay circuits. In this regard, the preferred embodiment utilizes voltage controlled time-delay circuits $\tau_1$ through $\tau_5$, each having a respective voltage control signal input $V_1$ through $V_5$. A microprocessor or other suitable monitoring circuit 28 can be used to monitor the control voltages and compute the delay time from these voltages. Upon correlation of the detector output signals, as determined by the signal processing circuit 26 from the integrator outputs, a digitized signal indicating the correlation may be transmitted along line 31 to microprocessor 28. The computed time-delays may then be computed by microprocessor 28, digitized, and transmitted along line 29 (FIG. 1) to signal processor 26 wherein the coordinates of the body are computed from the time-delays which produced the significant integrator outputs. In addition, the specific time-delay circuits shown in FIG. 1 are also frequency controlled in that the control voltage is converted to a frequency signal, which then controls the time-delay. Therefore, the FIG. 1 circuit may include respective frequency output channels $f_1$ through $f_5$. These channels provide an output of the respective frequency control signals fed to time-delay circuits $\tau_1$ through $\tau_5$ and may be monitored by a frequency counter or other monitoring device 30 to provide another convenient indication of the delay times. It should, of course, be emphasized that any suitable time-delay circuits may be utilized. Also, other means of delaying the detected signals are of course also suitable, such as by moving the detectors relative to one another.

GEOMETRY OF DETECTORS

When at least four detectors are employed in the intensity interferometer system, there is a one-to-one correspondence between the time-delays, $\tau_1$ through $\tau_4$ which result in a significant output from the integrators ($v$ $I_3$) which integrates the product of the four detected signals, and the three-dimensional coordinates of the body. Although there are numerous suitable detector arrangements, certain arrangements facilitate the computations of coordinates of the body from the delay times which result in the significant integrator output. In general, a predetermined geometric array of detectors are selected such that the respective transit times are related to one another by a readily derivable constraint condition.

Figure 2:
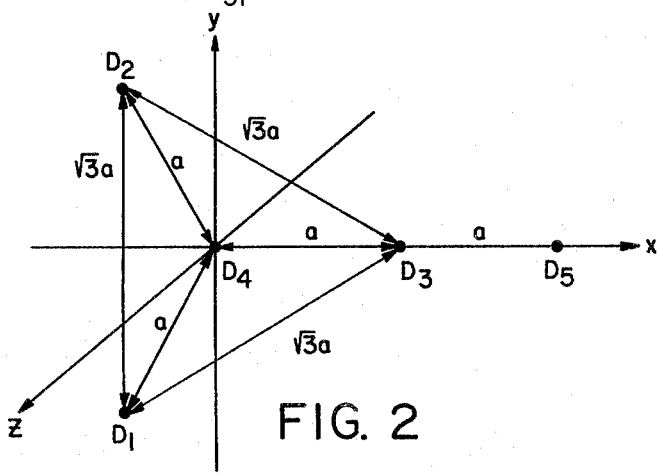
FIG. 2 is a diagram of a preferred geometric arrangement of detectors utilized in conjunction with the embodiment of FIG. 1.

For example, with reference to the preferred geometry of FIG. 2 and a body located at some point in space having coordinates X, Y and Z, the following relationships exist. The distance of travel of radiation from the body to detector $D_1$ is $ct_1$ wherein c is the speed of propagation of the radiation and $t_1$ is the transit time of radiation from the body to detector $D_1$. Likewise, the distance of travel of radiation from the body to detector $D_2$ may be expressed $ct_2$, detector $D_3$ is $ct_3$ and to detector $D_4$ is $ct_4$. Furthermore, a geometric constraint condition is established by the arrangement of detectors namely:

$$t_1^2 + t_2^2 + t_3^2 = 3t_4^2 + 3(a/c)^2$$

with a being the distance shown in FIG. 2.

Furthermore, given this constraint condition, the following relationships exist between $t_1$, $t_2$, $t_3$, $t_4$ and these time-delays $\tau_1$, $\tau_2$, $\tau_3$, and $\tau_4$:

$$t_1 = \tfrac{1}{2}\left[\frac{3(\tau_4 - \tau_1)^2 - (\tau_2 - \tau_1)^2 - (\tau_3 - \tau_1)^2 + 3\left(\frac{a^2}{c^2}\right)}{3(\tau_4 - \tau_1) - (\tau_2 - \tau_1) - (\tau_3 - \tau_1)}\right] \quad (8)$$

$$t_2 = \tfrac{1}{2}\left[\frac{3(\tau_4 - \tau_2)^2 - (\tau_1 - \tau_2)^2 - (\tau_3 - \tau_2)^2 + 3\left(\frac{a^2}{c^2}\right)}{3(\tau_4 - \tau_2) - (\tau_1 - \tau_2) - (\tau_3 - \tau_2)}\right]$$

$$t_3 = \tfrac{1}{2}\left[\frac{3(\tau_4 - \tau_3)^2 - (\tau_1 - \tau_3)^2 - (\tau_2 - \tau_3)^2 + 3\left(\frac{a^2}{c^2}\right)}{3(\tau_4 - \tau_3) - (\tau_1 - \tau_3) - (\tau_2 - \tau_3)}\right]$$

$$t_4 = \tfrac{1}{2}\left[\frac{(\tau_1 - \tau_4)^2 + (\tau_2 - \tau_4)^2 + (\tau_3 - \tau_4)^2 - 3\left(\frac{a^2}{c^2}\right)}{(\tau_1 - \tau_4) + (\tau_2 - \tau_4) + (\tau_3 - \tau_4)}\right]$$

Furthermore, once the set of time-delays $\tau_1$ through $\tau_4$ which produce an output from integrator $I_3$ are known, then respective values of $t_1$, $t_2$, $t_3$, and $t_4$ can be computed. These results can then be utilized to determine the x, y, z coordinates of the body and its range, from the following formulas:

$$r = ct_4 \text{ (range from } D_4\text{)} \quad (9)$$

$$x = \frac{a}{2} + \frac{1}{2a}[(ct_4)^2 - (ct_3)^2]$$

$$y = \frac{1}{2\sqrt{3a}}[(ct_1)^2 - (ct_2)^2]$$

$$z = [r^2 - x^2 - y^2]^{\frac{1}{2}}$$

Figure 3:
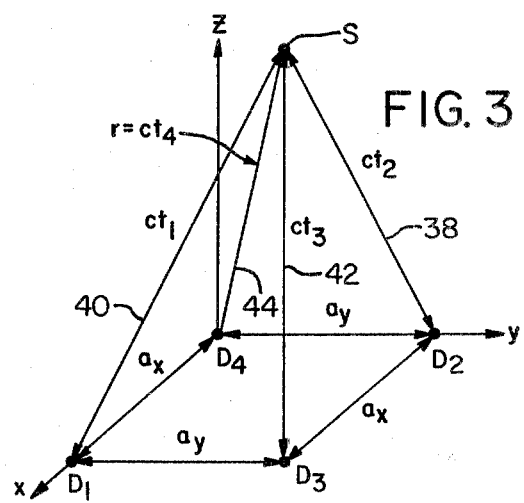
FIG. 3 is an illustration of another exemplary geometric arrangement of detectors.

To illustrate the exemplary nature of the geometry of FIG. 2, the geometry of FIG. 3 is shown. With this arrangement, the constraint condition is readily determined as:

$$(t_1 - t_4)(t_1 + t_4) = (t_3 - t_2)(t_3 + t_2)$$

From this and the geometry of the FIG. 3 detector arrangement, the following formulas relate the x, y, and z coordinates of the body, and its range from detector $D_4$ in terms of those measured time-delays $\tau_1$ through $\tau_4$:

$$x = \frac{a_x}{2} + \frac{c^2}{2a_x}\left[(\tau_1 - \tau_4)(\tau_2 - \tau_3)\left[\frac{(\tau_2 - \tau_1) + (\tau_3 - \tau_4)}{(\tau_1 - \tau_3) + (\tau_2 - \tau_4)}\right]\right] \quad (10)$$

-continued $$y = \frac{a_y}{2} + \frac{c^2}{2a_y}\left[(\tau_2 - \tau_4)(\tau_1 - \tau_3)\left[\frac{(\tau_1 - \tau_2) + (\tau_3 - \tau_4)}{(\tau_2 - \tau_3) + (\tau_1 - \tau_4)}\right]\right]$$

$$r = \frac{c}{2}\left[\frac{(\tau_1 - \tau_4)^2 + (\tau_2 - \tau_3)(\tau_2 - \tau_4) + (\tau_2 - \tau_3)(\tau_3 - \tau_4)}{(\tau_1 - \tau_3) + (\tau_2 - \tau_4)}\right]$$

$$z = [r^2 - x^2 - y^2]^{\frac{1}{2}}$$

wherein $a_x$ and $a_y$ are shown in FIG. 3.

Other suitable geometric arrangements will, of course, be apparent to those skilled in the art. Also, suitable adjustments in the computations are made in the event the radiation travels through a non-homogeneous medium.

DETAILED DESCRIPTION DETECTORS

Any suitable detectors for the particular frequency range of interest may be utilized. As mentioned above, in the acoustic frequency range, typically microphones, transducers or other amplitude-sensitive detectors are employed. Also, a squarer or other circuit ahead of the integrator circuit is used to convert the amplitude representations of the detected radiation from the detectors into intensity representations. These detectors are arranged in a predetermined geometric array such as explained above. For other applications, particularly those in electromagnetic radiation frequency ranges, square law detectors may be used to provide direct intensity representations of the detected radiation. In the electromagnetic frequency domain, the detectors are characterized by fast rise times and frequency responses. Antennaes, solid state diodes, photon counters, and so forth, are indicative of the wide variety of suitable detectors that may be employed.

AMPLIFIER SIGNAL SQUARER CIRCUIT

Figure 4:
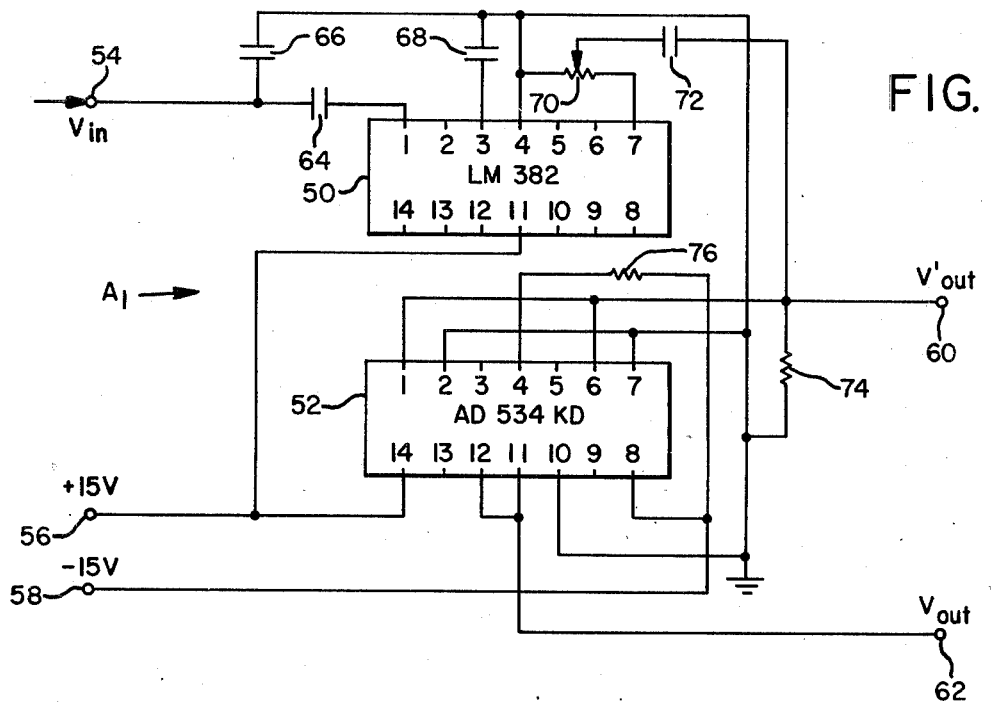
FIG. 4 is a circuit diagram of one form of amplifier squarer circuit utilized in FIG. 1.

FIG. 4 illustrates a specific embodiment of an amplifier squarer circuit $A_1$. The circuits $A_2$ through $A_5$ may be similar and, hence, will not be described in detail. Of course, amplification of the detected signals is not required if the detected signals are sufficiently strong. The amplifier squarer circuit of FIG. 4 comprises a National Semiconductor LM382 low-noise dual pre-amplifier circuit 50 and an Analog Devices AD534 KD precision multiplier circuit 52. This circuit has an input 54 which receives the output signal from detector $D_1$ and produces two output signals. The first such output at 60 comprises an amplified unsquared representation of the input signal at 54 for use in applications in which squaring of the detected radiation signal takes place elsewhere in the circuit. The second output at 62 represents the amplified squared input signal which is received at 54.

More specifically, the input signal is coupled by a one microfarad capacitor 64 to pin 1 of pre-amplifier 50. This input is also coupled to ground by a 0.01 microfarad high frequency filter capacitor 66. A 10 microfarad amplification establishing capacitor 68 is coupled between pin 3 of preamplifier 50 and ground. Pin 4 of circuit 50 is grounded while pin 7 is grounded through a 1 kohm volume control potentiometer 70. The output of potentiometer 70 is coupled by a 10 microfarad capacitor to circuit output 60 and to pins 1 and 6 of multiplier 52. Also, a 4.7 kohm grounding resistor 74 couples output 60 to ground. Pins 1 and 6 of multiplier circuit 52 are also grounded through resistor 74. A positive 15-volt direct-current voltage is fed from an input 56 to pin 11 of circuit 50 and pin 14 of circuit 52, while a negative 15-volt direct-current voltage is fed from an input 58 to pin 8 of circuit 52 and through a 3 kohm scale establishing resistor 76 to pin 4 thereof. The output voltage from pins 11 and 12 of circuit 52, which appears at squarer circuit output 62, is equal to the product of the signal at pins 1 and 6 of multiplier 52 from pre-amplifier 50, divided by the scale factor. For a 3 kohm resistor 76, the scale factor is equal to four. Pins 2, 7 and 10 of circuit 52 are grounded. Thus, with these connections, the output at pin 62 comprises an amplitude squared representation of the input signal at pin 54.

TIME-DELAY CIRCUIT

Figure 5:
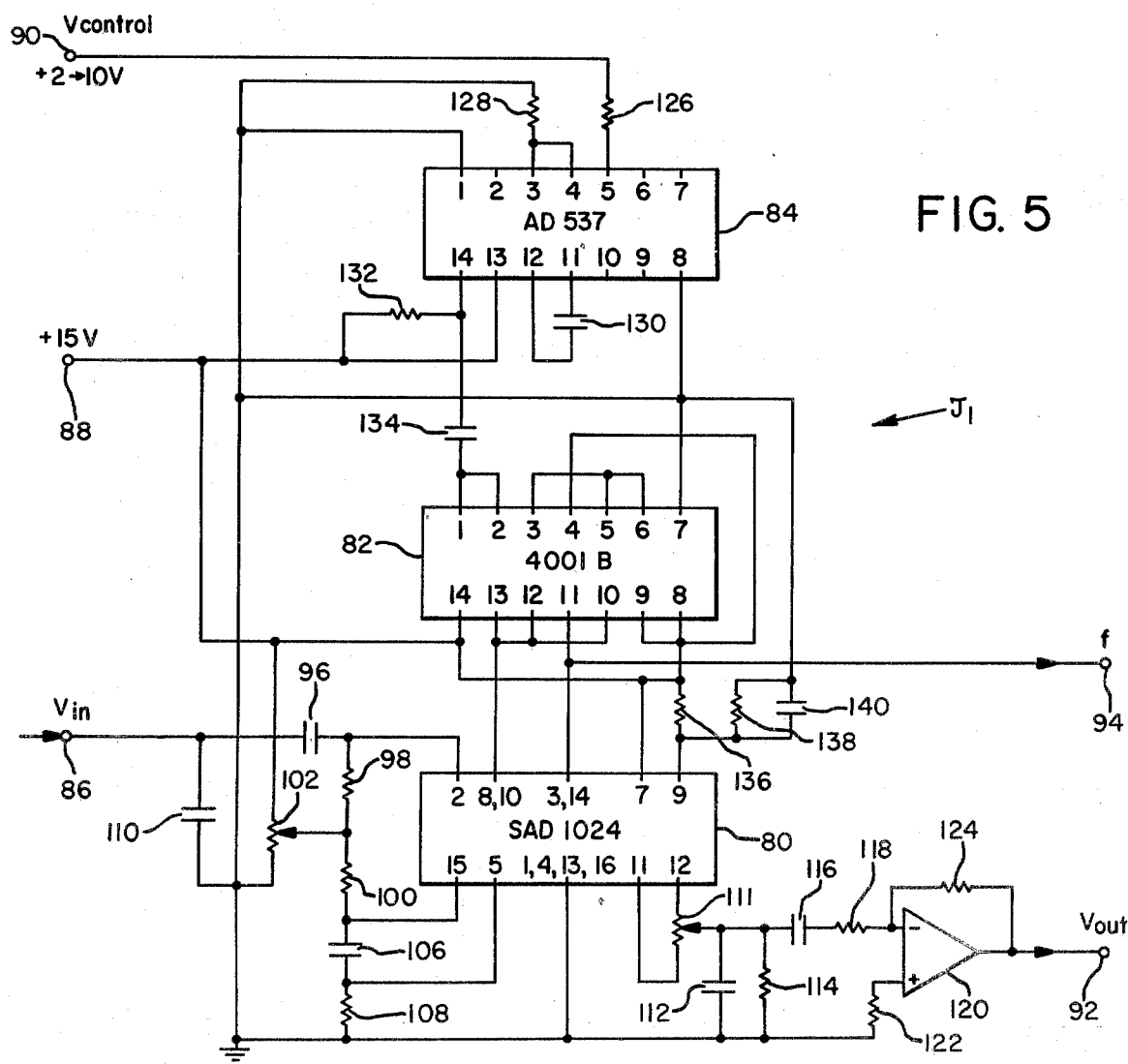
FIG. 5 is a circuit diagram of one form of time-delay circuit utilized in FIG. 1.

A wide variety of time-delay means for delaying the detected signals relative to one another are suitable and will be readily apparent to those skilled in the art. However, one specific example of a time-delay circuit is illustrated in FIG. 5. In FIG. 5, an electronic time-delay circuit $\tau_1$ is illustrated for delaying the signal detected by detector $D_1$ a delay time $\tau_1$. Circuits $\tau_2$ through $\tau_5$ may be similar and therefore will not be described in detail.

Time-delay circuit $\tau_1$ utilizes an Analog Devices AD537 voltage to frequency converter 84, a CD4001B Nor gate 82 and a Radio Shack SAD1024 dual analog delay line 80. The output signal from amplifier squarer circuit $A_1$ is fed to an input 86 of delay line 80 while a representation of this input signal, delayed by a delay time $\tau_1$, is generated at the output 92 of the delay line 80. This specific circuit varies the duration of delay time $\tau_1$ in response to variations in a control voltage input signal at an input 90 to voltage to frequency converter 84. More specifically, the magnitude of the control voltage fed to circuit 84 controls the frequency of a clocking signal output from Nor gate 82 which, in turn, controls the duration of the time-delay $\tau_1$ established by delay line 80.

More specifically, the control voltage signal at 90 is coupled through a 10 kohm input limiting impedance resistor 126 to pin 5 of voltage to frequency converter 84. Pins 3 and 4 of converter 84 are interconnected and grounded through a 3.3 kohm resistor 128. Also, pins 11 and 12 of this circuit are connected together through a 0.001 microfarad capacitor 130. Resistor 128 and capacitor 130 determine the voltage to frequency conversion relationship of circuit 84. That is, the output frequency of the signal produced by circuit 84 is equal to the input voltage times the product of resistor 128 and capacitor 130, this quantity divided by ten. Pins 1 and 8 of circuit 84 are grounded while pin 13 is connected to a 15-volt direct-current voltage supply at input 88. Input 88 is also coupled through a 4.7 kohm resistor 132 to pin 14. Also, a 0.1 microfarad coupling capacitor 134 couples the output at pin 14 of converter circuit 84 to input pins 1 and 2 of Nor gate 82.

The direct current voltage at input 88 is also fed to pins 4, 8, 9 and 14 of Nor gate 82. Also, pins 3, 5 and 6 of the Nor gate are interconnected while its pin 7 is grounded. In addition, pins 10, 12 and 13 of Nor gate 82 are interconnected and connected to pins 8 and 10 of delay line circuit 80. Furthermore, a clocking signal output at pin 11 of Nor gate 82 is fed to pins 3 and 14 of the delay line circuit. The output at pin 11 of Nor gate 82 is coupled to a frequency monitoring output channel 94 which is connected to frequency monitor 30 of FIG. 1 as explained above.

The input signal at 86 of delay line 80 is coupled via a 15 microfarad coupling capacitor 96 to pin 2 of this circuit. A 0.01 microfarad high frequency filtering capacitor couples input 86 to ground. Also, the voltage supply at input 88 is coupled through a 10 kohm potentiometer 102 to ground. Pin 2 is connected through series connected 100 kohm biasing resistors 98, 100 to pin 15. In addition, the wiper arm of potentiometer 102 is connected at the midpoint of this resistor pair for establishing a positive bias voltage at pins 2 and 15 of the delay line circuit. Pin 15 is also connected through a 1 microfarad capacitor 106 to pin 5 of the circuit, with this latter capacitor functioning to couple the two sections of the dual analog delay line together. Pin 5 is grounded through a 1 kohm biasing resistor 108. Also, pins 1, 4, 13 and 16 of this circuit are grounded. In addition, the 15-volt direct-current voltage at input 88 is fed to pin 7 of delay line circuit 80. This pin is also grounded through a voltage divider comprising a series connected 1.8 kohm resistor 136 and 27 kohm resistor 138 which are in turn grounded. Pin 9 of circuit 80 is connected at the point of interconnection of these resistors to provide the appropriate biasing voltage for the circuit. Also, a 0.1 microfarad filtering capacitor 140 is connected in parallel with resistor 138.

The output signal of delay line circuit 80 is taken from a 1 kohm potentiometer 111 which interconnects pins 11 and 12 of this circuit. Filtering of clocking signal disturbances from this output signal is accomplished by a resistor capacitor filtering including a 0.01 microfarad capacitor 112 and a 10 kohm resistor 114 connected in parallel and between the output of potentiometer 110 and ground. The output signal from delay line 80 is also coupled through a 1.2 microfarad coupling capacitor 116 and a 10 kohm resistor 118 to the inverting input of an operational amplifier 120. The non-inverting input of this operational amplifier is grounded through a 470 kohm resistor 122. A 220 kohm feedback resistor 124 couples the output of the operational amplifier 120 to the inverting input and together with resistor 118 establishes the gain of this operational amplifier. The output 92 from time-delay circuit $\tau_1$ is taken from the output of operational amplifier 120.

Thus, as mentioned above, time-delay circuit $\tau_1$ produces an output signal at 92 which is a time-delayed representation of the input signal at 86. Furthermore, because the control voltage at 90 is variable, the delay time $\tau_1$ established by this circuit is correspondingly variable. Furthermore, because such a delay circuit is interposed in each channel of the preferred embodiment of the invention, a form of scanning can be accomplished. That is, the time-delays in the respective signal channels can be varied to time-shift the detected signals relative to one another until an output signal is produced from integrator $I_3$. Such an integrator output indicates a correspondence between the set of delay times $\tau_1$ through $\tau_4$ which result in the integrator output, and the three-dimensional coordinates of the body. Of course, certain of the delays can be fixed while others are variable if more limited scanning is desired.

The above circuit is particularly suitable for frequencies in the acoustic range of from 10 hertz to 20 kilohertz. For frequencies in the 20 kilohertz to 1 megahertz range, circuit 84 may comprise an Analog Devices AD460 voltage to frequency converter. Also, for longer desired time-delays, several dual analog delay lines can be connected in series with the clocking frequency being at least two times the highest expected signal frequency. Also, with the above circuit, a differently shaped voltage control signal can be utilized to vary the time-delay. For example, a triangle-wave voltage generator may be utilized as the control voltage source for relatively fast scanning, fast time-delay applications.

Furthermore, although a particular circuit is described, relative time-delays of the detected signals can be accomplished in numerous ways. The invention is not limited to any particular manner of accomplishing the time-delay. For example, the detectors can be moved relative to one another to increase the time it takes the radiation to travel from the body to the detectors. Alternately, mirrors can be utilized to alter the length of the signal path from the body to the detectors, or variable length delay cables can be utilized. These latter techniques are particularly useful in electromagnetic radiation frequency ranges. Typically, when dealing with electromagnetic radiation, maximum delay times are on the order of 6.7 nanoseconds per meter of the largest detector separation. On the other hand, in acoustic frequency ranges, typical maximum delay times are on the order of 6 microseconds per meter of the largest detector separation. Thus, time-delay means are typically selected to accomplish delays appropriate for the radiation and detector separation in question.

MULTIPLIER CIRCUIT

FIG. 6 illustrates a specific form of multiplier circuit means suitable for the FIG. 1 embodiment of the invention. This circuit is shown receiving time-delayed signals on channels or lines 1, 2, 3 and 4 from the respective time-delay circuits $\tau_1$, $\tau_2$, $\tau_3$ and $\tau_4$ of time-delay circuit 20.

In particular, this specific circuit comprises three interconnected Analog Devices AD534KD precision multipliers 150, 152 and 154. Multiplier 150 has inputs 156 and 158, which receive the time-delayed signals on lines 1 and 2 and produces an output signal at 168 comprising the product of these two received signals. Likewise, multiplier 152 receives a first input at 160 comprising the time-delayed signal on line 3 from time-delay circuit $\tau_3$ and a second input, at pin 6, representing the product of the two signals on lines 1 and 2 generated by multiplier 150. Multiplier 152 combines these first and second input signals and produces an output signal at 170 which represents the product of signals on lines 1, 2 and 3. Also, multiplier 154 receives a first input comprising the time-delayed signal on line 4 from time-delay circuit $\tau_4$ and a second input, at pin 6, representing the product of the signals on lines 1, 2 and 3 which is generated by multiplier 152. Multiplier 154 combines these input signals to produce an output signal at 172 which represents the product of the signals on lines 1, 2, 3 and 4. As previously mentioned, when this latter signal is integrated over time by integrator $I_3$, a significant integrator output signal is produced only when the time-delays established by circuits $\tau_1$ through $\tau_4$ have been adjusted such that the delay times established thereby correspond in a one-to-one relationship with the three-dimensional coordinates of the body.

In FIG. 6, the signal at 156 from time-delay circuit $\tau_1$ is coupled by a 10 microfarad capacitor 174 to pin 6 of multiplier 150. In addition, the signal at 158 from time-delay circuit $\tau_2$ is coupled through another 10 microfarad capacitor 176 to pin 1 of this multiplier circuit.

Pins 1 and 6 are also grounded through respective 4.7 kohm resistors 178 and 180. In addition, pins 2, 7 and 10 of each of the multipliers 150, 152 and 154 are grounded. Also, a positive 15-volt direct-current voltage supply at 164 is fed to pin 14 of each multiplier circuit 150, 152, 154. In addition, a negative 15 volt direct-current voltage supply is fed directly to pin 8 of each multiplier circuit and also through respective 3 kohm resistors 198, 200 and 202 to pins 4 of these multiplier circuits. Pins 11 and 12 of multiplier circuit 150 are interconnected and provide an output signal at 168 corresponding to the product of the signals on lines 1 and 2. As mentioned above, this output provides general information concerning the location of the source relative to the location of the detectors.

The signal at 160 from time-delay circuit $\tau_3$ is coupled in a similar manner through a 10 microfarad coupling capacitor 190 to an input of multiplier 152 at pin 6. This latter pin is also grounded through a 4.7 kohm resistor 192. Thus, the output of multiplier 152 corresponds to the product of two input signals. The first such input signal corresponds to the product of the signal from time-delay circuits $\tau_1$ and $\tau_2$ on lines 1 and 2 and fed to pin 6 of this multiplier. The second such input signal is obtained on line 3 from time-delay circuit $\tau_3$ and is fed to pin 1 of this multiplier. The output from multiplier 152 corresponding to the product of the time-delayed signal on lines 1, 2 and 3, appears at its interconnected pins 11 and 12 and is fed to output 170.

In the same manner, the output from time-delay circuit $\tau_4$ is coupled through a 10 microfarad coupling capacitor 184 to pin 1 of multiplier 154. Also, this pin 1 is grounded through a 4.7 kohm resistor 188. In addition, an input corresponding to the product of the signals on lines 1, 2 and 3 from pin 11 of multiplier 152 is coupled through a 10 microfarad coupling capacitor 194 to pin 6 of multiplier 154. This latter pin is also grounded through a 4.7 kohm resistor 196. Thus, the output at 172, taken from the interconnected pins 11 and 12 of multiplier 154, corresponds to the product of the signals on lines 1, 2, 3 and 4.

In the same manner, in the event more than four detected signals are to be processed, additional multipliers can be added. Although this sequence of multiplication is preferred, alternate multiplier circuits are of course suitable. For example, in the FIG. 13 version, signals on lines 1 and 2 are combined in one multiplier, while signals from lines 3 and 4 are combined in another multiplier. The output signals from these multipliers are then combined in a third multiplier, which produces an output representing the product of the signals on lines 1, 2, 3, and 4 which is then integrated. In an at least four detector system, at least one multiplier is utilized which produces a multiplier output signal corresponding to the product of the time-delayed signals from a selected four of the detectors. This multiplier output signal is utilized in determining the three-dimensional coordinates of the body.

INTEGRATOR CIRCUIT

One form of integrator circuit used in the preferred embodiment of FIG. 1 includes integrators such as shown in FIG. 7. In particular, for applications in the acoustic frequency range of from 10 hertz to about 20 kilohertz, a pair of Analog Devices AD540K operational amplifiers 210 and 212 may be used. The first of these operational amplifiers 210 integrates a signal received at an input 214 from a respective multiplier circuit. The second operational amplifier 212 is connected as a voltage follower to reduce the effect of variations in the output load on the integration. The output of the integrator circuit appears at 218 and is significant, that is, has a sharply defined non-zero peak when the detected signals associated with the integrator have been time-shifted to bring them into correlation.

More specifically, the input signal at pin 214 is fed through a 1 kohm potentiometer 220 to ground. The potentiometer output is coupled through a 10 kohm resistor 222 to the non-inverting input, pin 3, of this operational amplifier. The inverting input, pin 2, of operational amplifier 210 is grounded through a 10 kohm resistor 236. Integration is performed by a 1 microfarad capacitor 226 connected between the output of amplifier 210 and its inverting input. A one megohm resistor 224 is connected in parallel with capacitor 226 and together with resistor 222 establishes the gain of the operational amplifier 210. Also, resistor 224 and capacitor 226 establish the integration time constant of the circuit. Pins 1 and 5 of operational amplifier 210 are coupled together through a 10 kohm potentiometer which is connected to a negative 15-volt direct-current voltage supply at 216. This voltage supply and potentiometer establishes the direct-current voltage output level of operational amplifier 210. The output of amplifier 210 is connected through a 100 kohm resistor 228 to the non-inverting input, pin 3, of operational amplifier 212. This latter pin is also grounded through a 2.2 microfarad capacitor 238 which, together with resistor 228, filters the signal from operational amplifier 210. A feedback loop 230 is provided between the output and inverting input of operational amplifier 212. In addition, pins 1 through 5 of operational amplifier 212 are connected together through a 10 kohm potentiometer 234 which in turn is coupled to the negative supply voltage input at 216.

The output of the integrator circuit is taken from the output of operational amplifier 212 and provides a measure of the input signal at pin 214, and hence of the intensity of radiation received by the respective detectors as function of the selected delay times. This output signal represents the correlation of the time-delayed signals. This correlation term is insignificant unless the time-delays have been adjusted to correspond to those associated with the location of the body in space. In general, the larger the bandwidth of the incoherent radiation received from the body, and hence the greater its incoherence, the sharper the output signal from the integrator when the time-delays have been appropriately adjusted.

For radiation of other frequencies, suitable integrator circuits are readily available. As one example, when electromagnetic frequency signals are processed, charge sensitive fast rise time amplifiers may be utilized to perform the integration.

EMBODIMENT OF FIG. 11

The preferred embodiment of FIG. 11 operates in much the same manner as the embodiment described in detail in connection with FIG. 1. However, instead of variable time-delay circuits, the FIG. 11 embodiment utilizes plural sets 20a, 20b, 20c, etc. of fixed time-delay circuits $\tau_1$ through $\tau_5$. The set of delay times $\tau_1$ through $\tau_5$ established by time-delay circuit 20a, corresponds to one location in three-dimensional space. Furthermore, the set of the delay times established by time-delay circuit 20b correspond to another location in space.

Also, the set of delay times established by time-delay circuit 20c correspond to a third location in space, and so forth with a fourth, fifth and further time-delay circuits. Hence, by employing a large number of these time-delay circuits, a three-dimensional grid is established with the set of delay times established by each time-delay circuit corresponding to a particular point in the grid. Respective multiplier circuits 22a, 22b, 22c, etc. and integrator circuits 24a, 24b, 24c, etc. are provided for each of the time-delay circuits. In addition, a signal-processor circuit 26a, b, c, etc. is provided for receiving the output signals from the various integrators.

When a body emanating incoherent radiation is located at a position or grid point which matches the point represented by a particular time-delay circuit, for example, circuit 20b, only the integrator associated with that time-delay circuit produces a significant output signal. Thus, in this example, only integrator circuit 24b would produce such an output signal. The signal-processor circuit identifies which integrator is producing a significant output signal and, from the delay times $\tau_1$ through $\tau_4$, associated with that integrator, determines the point in space at which the body is located.

Also, if plural bodies are located at various grid points, the outputs from the integrators associated with these grid points simultaneously indicate the respective locations of these bodies.

Figure 11:
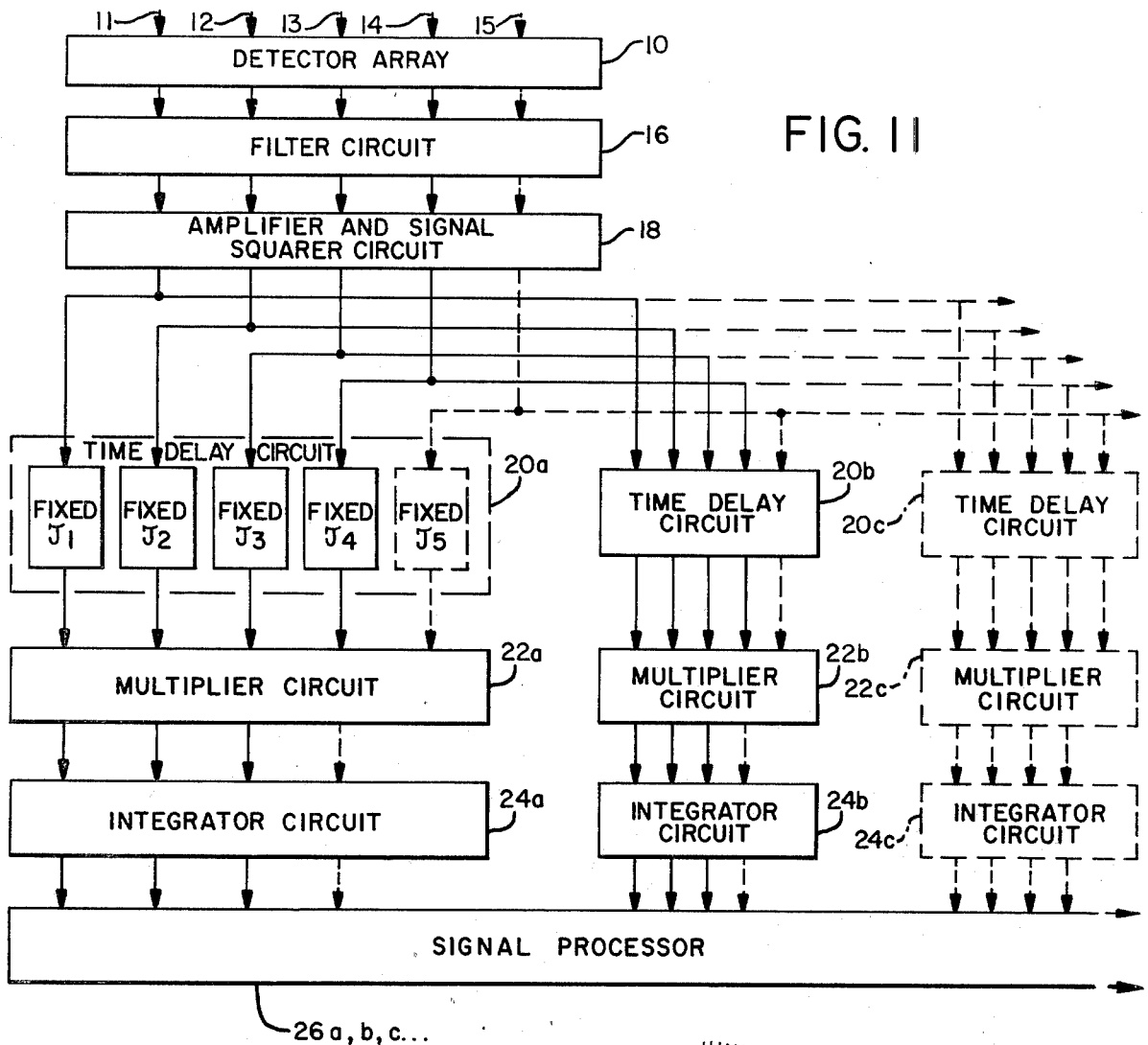
FIG. 11 is a block diagram of an alternate embodiment of the invention employing plural sets of fixed time-delay circuits, multiplier circuits and integrator circuits.

The embodiment of FIG. 11 does not utilize scanning, that is, a process of varying the delay times until the detected signals are correlated. Hence, in many applications, a more rapid determination of the location of the body is produced by this embodiment. Also, by tracking the location of the body over time as it moves from one grid point to another, the velocity and direction of travel of the body can be determined. This latter information can also be determined from the scanning techniques explained previously.

EMBODIMENT OF FIG. 12

Figure 12:
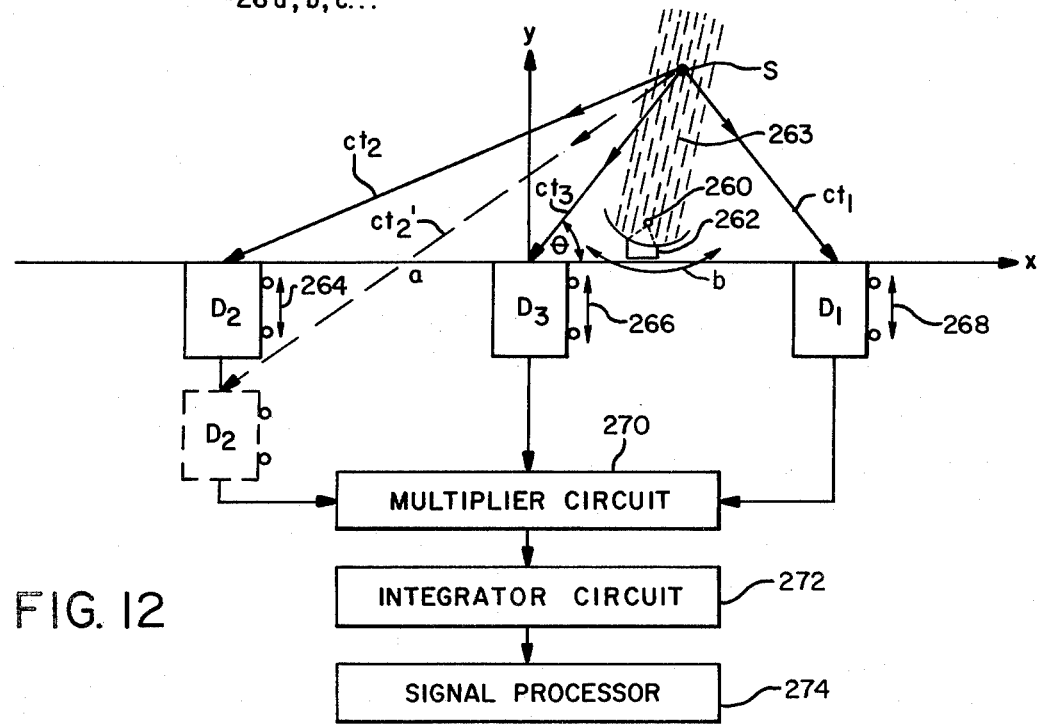
FIG. 12 illustrates a three detector embodiment of the invention and which shows time-delays accomplished by moving the detectors relative to one another and also shows the scattering of a collimated beam of light from a body.

Still another embodiment of the invention which is suitable in some applications, in which the two-dimensional coordinates of the body are desired, is illustrated in FIG. 12. In particular, three detectors are illustrated in a predetermined geometric relationship. For example, along a single line which is the x axis of a two-dimensional coordinate system. Each such detector $D_1$, $D_2$ and $D_3$ is mounted by a respective means, such as on guides 264, 266, 268 for movement in a direction normal to the x axis. Such movement varies the time taken for radiation to travel from a body or source S to the respective detector. Thus, the time-delays $\tau_1$, $\tau_2$, and $\tau_3$ of the detected signals are established by relative movement of the detectors. For example, detector $D_2$ is shown moved from a first position, shown by solid lines, to a second position, shown by dashed lines. When in the first position, the time of travel to the detector from the body is $t_2$, while a longer time $t_2'$, is taken to travel to the detector when in the second position.

Furthermore, with this geometric arrangement of detectors, the following constraint condition is established:

$$t_3^2 = (t_1^2/2) + (t_2^2/2) - (a/c)^2$$

Furthermore, $t_1$, $t_2$ and $t_3$ can be computed in terms of the measured delay times $\tau_1$, $\tau_2$, and $\tau_3$, which correlate the signals as follows:

$$t_1 = \frac{(\tau_2 - \tau_3)^2 - (\tau_1 - \tau_3)^2 - 2(\tau_1 - \tau_3)(\tau_2 - \tau_3) - 2\left(\frac{a}{c}\right)^2}{2(\tau_1 + \tau_2 - 2\tau_3)} \quad (11)$$

$$t_2 = \frac{(\tau_1 - \tau_3)^2 - (\tau_2 - \tau_3)^2 - 2(\tau_1 - \tau_3)(\tau_2 - \tau_3) - 2\left(\frac{a}{c}\right)^2}{2(\tau_1 + \tau_2 - 2\tau_3)}$$

$$t_3 = \frac{(\tau_1 - \tau_2)^2 + (\tau_2 - \tau_3)^2 - 2\left(\frac{a}{c}\right)^2}{2(\tau_1 + \tau_2 - 2\tau_3)}$$

Furthermore, the two-dimensional coordinates of the body can be determined from the following formulas:

$$x = c^2 \left[ \frac{(\tau_1 - \tau_2)\left[(\tau_1 - \tau_3)(\tau_2 - \tau_3) - \left(\frac{a}{c}\right)^2\right]}{2a(\tau_1 + \tau_2 - 2\tau_3)} \right] \quad (12)$$

$$y = [(ct_3)^2 - x^2]^{\frac{1}{2}}$$

In addition, the range or distance of the body from the (0,0) coordinates of the x-y coordinate axis, assuming detector $D_3$ is located at this (0,0) position, is given by:

range = $ct_3$, where c is the speed of propagation of the radiation and the bearing $\theta$ is given by:

$$\theta = \tan^{-1}(y/x)$$

Multiplier circuit 270 may be identical to that shown in FIG. 6 with the exception that two multipliers 150, 152 are employed instead of the illustrated three. Thus, multiplier circuit 270 produces an output corresponding to the product of the signals received at detectors $D_1$, $D_2$ and $D_3$. As previously described, integrator circuit 272 and signal-processor circuit 274 are also employed.

In addition, FIG. 12 illustrates the system in an active application. That is, a beam of radiation, such as a light beam 263, is scattered from the body S and the scattered radiation is detected by detectors $D_1$, $D_2$ and $D_3$. More specifically, this scattered radiation is incoherent and can be obtained by scattering or reflecting a collimated beam of radiation from the body. Such a beam may be obtained in any well known manner such as, for example, by placing a light source 260 at the focus of a parabolic mirror 262 and directing the mirror towards the body. The mirror may be mounted for movement, as indicated by an arrow "b", to scan the region of space in which the body is located. Scattered radiation is produced when the beam impinges upon the body. Such movements of detectors and scattering of radiation can, of course, be used in connection with the four or more detector embodiments as well.

OPERATION

One specific example of the operation of the FIG. 1 form of the apparatus and the FIG. 3 geometry will be described in conjunction with FIGS. 8, 9 and 10. In this application, the three-dimensional coordinates of a source of incoherent acoustic radiation is determined. In one approach, the delay time $\tau_1$ established by time-delay circuit $\tau_1$ is fixed at a value appropriate for the geometry in question so that none of the time-delays $\tau_1$ through $\tau_4$ are negative. In this example, $\tau_1$ is fixed equal to 2.274 milliseconds. The time-delay established by circuit $\tau_2$ is then varied until a significant integrator output signal is produced as illustrated in FIG. 8. The peak of this output signal occurred at a time-delay $\tau_2$ equals 2.330 milliseconds. Thus, the time-delays $\tau_1$ and $\tau_2$ are established. The time-delay $\tau_2$ is set at a value which produced the maximum of the particular resonance shown in FIG. 8. This resonance maximum is associated with a single isolated radiation source.

The delay time $\tau_3$ is then established by time-delay circuit $\tau_3$. That is, time-delay $\tau_3$ is varied until integrator $I_2$ produces a significant output indicating a correlation of signals from detectors $D_1$, $D_2$ and $D_3$. In this example, as shown in FIG. 9, a sharp peak in the output of Integrator $I_3$ occurred at $\tau_3$ equals 2.275 milliseconds. Thereafter, the delay time $\tau_4$ is varied until a sharp peak in the output from integrator $I_3$ is obtained. In this example, this latter peak occurred at $\tau_4$ equals 2.327 milliseconds and indicates that these time-delays correlate the signals obtained from the four detectors $D_1$, $D_2$, and $D_3$ and $D_4$. The three-dimensional coordinates of the radiation source can then be computed from this set of established time-delays, $\tau_1$ through $\tau_4$ using the formulas set forth above. This location is distinguished by the apparatus from locations of nearby sources which also emanate radiation within resolution limits of the apparatus.

In this manner, the location of a source, such as engine noise from a ship can be established. Conversely, given the location of a source, such as a beacon or foghorn in navigation, one can determine coordinates of detectors mounted on a ship. Hence, the navigator of the ship is provided with precise information concerning the location of the ship.

The width of the output signal from the integrator depends upon the coherence time of the radiation and the resolution of the source relative to the coherence length. Also, detailed analysis of the peaks in the integrator output signal yields information on spatial and spectral distribution of radiation from the body.

Although the operation is described in connection with one specific application of the apparatus, it is of course to be understood that a wide range of applications are possible. Furthermore, one can readily use either analog or digital processing of signals in a straightforward manner, whichever is most convenient for the particular application.

Having illustrated and described the principles of my invention with reference to several preferred embodiments, it should be apparent to those persons skilled in the art that this invention can be modified in arrangement and detail without departing from such principles.

I claim:

1. An apparatus for receiving incoherent radiation from a body and for determining, from the received radiation, the location of the body relative to a three-dimensional reference coordinate system comprising:

a detector array of N spaced apart radiation detector means, wherein N is at least four, said detector means being positioned in a predetermined geometric relationship relative to the reference coordinate system, each such detector means comprising means for detecting radiation from the body and for producing a detector output signal corresponding to the radiation it receives;

time-delay means for time-delaying the detector output signals relative to one another to produce at least four time-shifted output signals each time-shifted by a respective delay time and each corresponding to the time-delayed detector output signal of an associated detector means;

multiplier circuit means including means for receiving said time-shifted output signals and for producing at least one multiplier output signal corresponding to the product of said at least four time-shifted output signals;

integrator circuit means for integrating said at least one multiplier output signal to produce a significant integrator output signal when the detector output signals have been time-delayed relative to one another to bring them into correlation;

intensity conversion means for converting signals reaching said integration circuit means into signals corresponding to the intensity of the detected radiation prior to the integration of said at least one multiplier output signal; and means for determining the set of delay times resulting in a significant integrator output signal and for computing the three-dimensional coordinates of the body from the set of delay times resulting in a significant integrator output signal.

2. An apparatus according to claim 1 in which said detector means each comprises a square law detector means having a radiation detecting input, said intensity conversion means being included in said square law detector means, said detector means each comprising means for producing a detector output signal corresponding to the intensity of the radiation it receives, whereby the at least one multiplier output signal also corresponds to the intensity of the detected radiation.

3. An apparatus according to claim 1 in which each said detector means comprises an amplitude sensitive detector means having a radiation detecting input for producing a detector output signal corresponding to the amplitude of the received radiation, and said intensity conversion means comprises squaring circuit means for receiving and squaring each detector output signal to convert each such signal into an intensity representation of the radiation received by the associated detector means prior to the time-delaying of such detector output signals by said time-delay means, whereby the first multiplier output signal also corresponds to the intensity of the detected radiation.

4. An apparatus according to claim 1 including signal processing circuit means for displaying the integrator output signal.

5. An apparatus according to claim 1 in which each detector means is identified by a number K with $K \epsilon [1,2,3, \ldots N]$ and the Kth time-shifted output signal corresponding to the time-delayed output signal of the Kth detector means;

said multiplier circuit means including $(N-1)$ multiplier means each identified by a number A with $A \epsilon [1,2,3 \ldots (N-1)]$, each said multiplier means having first and second inputs, and producing a multiplier output signal corresponding to the product of the signals received at the first and second inputs, the first such multiplier means having its first and second inputs coupled to said time-delay circuit means for producing a multiplier output signal corresponding to the product of the K=1 and K=2 time-shifted output signals, each succeeding multiplier means (A=2,3, ... N−1) having its first input coupled to the multiplier output signal from the (A−1) multiplier means and its second input coupled to the (K=A+1) time-shifted output signal to thereby provide a respective multiplier output signal which is equal to the product of the K=1,2, ... A+1 time-shifted output signals;

said integrator circuit means including (N−1) integrator means each identified by a number B with B∈ [1,2,3, ... (N−1)], the Bth integrator means comprising means for integrating the multiplier output signal from the A=B multiplier means; and said intensity conversion means comprising means for converting signals reaching said integrator circuit means into respective signals corresponding to the intensity of the detected radiation prior to the integration of said multiplier output signals.

6. An apparatus according to claim 5 in which N=4.

7. An apparatus according to claim 1 in which said time-delay means comprises plural sets of fixed time-delay circuit means, each set producing an associated set of at least four time-shifted output signals, the time-shifted output signals of each set being time-delayed differing delay times from the time delays of the time-shifted output signals of the other sets;

said multiplier circuit means comprising means for producing respective multiplier output signals each corresponding to the product of one set of at least four time-shifted output signals;

said integrator circuit means comprising means for separately integrating each said multiplier output signal and for producing a significant integrator output signal when integrating the set of time-shifted signals which bring the detector output signals into correlation; and said intensity conversion means comprising means for converting signals reaching said integrator circuit means into signals corresponding to the intensity of the detected radiation prior to integration of said multiplier output signals by said integrator circuit means.

8. An apparatus according to claim 1 in which said time-delay means comprise variable time-delay circuit means for varying the time-delays of the detector output signals relative to one another to bring them into correlation, thereby resulting in a significant integrator output signal upon such correlation.

9. An apparatus according to claim 1 including means for scattering radiation from the body, the scattered radiation being detected by said detector means.

10. An apparatus according to claim 9 including means for generating a collimated beam of radiation and for scattering the collimated beam of radiation from the body.

11. An apparatus according to claim 1 in which there are four of said detector means positioned in a common plane, three of said detector means being located at the vertices of an equilateral triangle and the fourth detector means being located at the center of the triangle.

12. An apparatus according to claim 1 in which there are four of said detector means positioned in a common plane with each detector means being positioned at a respective corner of a rectangle.

13. An apparatus for receiving incoherent radiation from a body and for determining, from the received radiation, the location of the body relative to a three-dimensional reference coordinate system comprising:

a detector array of four spaced-apart radiation detector means positioned in a predetermined geometric relationship relative to the reference coordinate system, each such detector means comprising means for detecting radiation from the body and for producing a detector output signal corresponding to the radiation it receives;

time-delay means for time-delaying the four detector output signals relative to one another to produce four time-shifted output signals each time-shifted by a respective delay time $\tau_1$, $\tau_2$, $\tau_3$, $\tau_4$, and each corresponding to the time-delayed detector output signal of an associated detector means; said time-delay means including means for varying said delay times relative to one another to bring the four detected signals to correlation;

multiplier circuit means including means for receiving said time-shifted output signals and for producing a multiplier output signal corresponding to the product of said four time-shifted output signals;

integrator circuit means for integrating said multiplier output signal to produce a significant integrator output signal when the detector output signal have been time-delayed relative to one another to bring them into correlation;

intensity conversion means for converting signals reaching said integrator circuit means into signals corresponding to the intensity of the detected radiation prior to the integration of said at least one multiplier output signal; and means for determining the set of delay times resulting in a significant integrator output signal and for computing the three-dimensional coordinates of the body from the delay times $\tau_1$, $\tau_2$, $\tau_3$, $\tau_4$, which result in the significant integrator output signal.

14. An apparatus according to claim 13 in which said multiplier circuit means comprises first, second and third multiplier means, each said multiplier means having first and second inputs and an output from which a signal is produced which corresponds to the product of the signals at the first and second inputs, the first multiplier means receiving a first and second of said time-shifted output signals at its respective first and second inputs, the second multiplier means receiving the output of said first multiplier means at its first input and the third time-shifted output signal at its second output, and the third multiplier means receiving the output of said second multiplier means at its first input and the fourth time-shifted output signal at its second input, whereby the output of said third multiplier means comprises the product of the four time-shifted output signals.

15. An apparatus according to claim 13 in which said multiplier circuit means comprises first, second and third multiplier means, each said multiplier means having first and second inputs and an output from which a signal is produced which corresponds to the product of the signals at the first and second inputs, the first multiplier means receiving a first and second of said time-shifted output signals at its respective first and second inputs, the second multiplier means receiving a third and fourth of said time-shifted output signals at its respective first and second inputs, and the third multiplier means receiving the multiplier output signals from said first and second multiplier means at its respective first and second inputs, whereby the output of said third multiplier means comprises the product of said four time-shifted output signals.

16. An apparatus according to claim 18 in which each said detector means comprises amplitude sensitive detector means having a radiation detecting input for producing a detector output signal corresponding to the amplitude of the received radiation, said intensity conversion means comprising an amplifier squarer circuit means for amplifying and squaring the detector output signals prior to transmitting such signals to said time-delay circuit means.

17. An apparatus according to claim 16 including filter circuit means for receiving and limiting the bandwidth of said detector output signals and for delivering the bandwidth limited detector output signals to said amplifier squarer circuit means.

18. An apparatus according to claim 13 in which said time-delay means includes four electronic time-delay circuit means each for time-delaying an associated one of said detector output signals.

19. An apparatus according to claim 18 in which each said time-delay circuit means comprises means for selectively varying the time-delay of its associated detector output signal.

20. An apparatus according to claim 19 in which each said time-delay circuit means comprises a voltage controlled time-delay circuit means for varying the time-delay of the associated detector output signal, said apparatus also including means for monitoring the control voltage to provide an indication of the delay times $\tau_1$, $\tau_2$, $\tau_3$, $\tau_4$.

21. An apparatus according to claim 20 in which each said time-delay circuit means includes means for converting said control voltage signals into frequency control signals, the delay times established by said time-delay circuits being responsive to said frequency control signals, said apparatus also including means for monitoring the frequency control signals to provide an indication of the delay time $\tau_1$, $\tau_2$, $\tau_3$, $\tau_4$.

22. A method of determining the three-dimensional coordinates of a body relative to a reference coordinate system for incoherent radiation emanating from the body comprising:
arranging at least four detector means in a known geometric relationship relative to the reference coordinate system;
detecting radiation from the body at the detector means and producing output signals from each detector, the detector output signals corresponding to the detected radiation;
multiplying the four detector output signals together to produce a product signal;
integrating the product signal;
converting the product signal into a representation of the intensity of the detected radiation at a step in the method which is prior to the integrating step; and
time-delaying the detector output signals relative to one another to produce a significant integration output signal when the detector output signals have been time-delayed to bring them into correlation; and
determining the three-dimensional coordinates of the body from the time-delays which result in the significant integrator output signal.

23. A method according to claim 22 including the step of varying the time-delays of the detector output signals to thereby scan various possible locations of the body until the time-delays resulting in the significant integrator output are determined.

24. A method according to claim 22 in which the step of time-delaying comprises the step of transmitting the detector output signals to plural sets of fixed time-delay circuits each set time-delaying the detector output signals an amount corresponding to a particular location of the body such that if the body is at the location corresponding to the set, a significant integrator output signal is produced, and also including the step of selecting the set of fixed time-delay circuits which result in the significant integrator output signal.

25. An apparatus for receiving incoherent radiation from a body and for determining, from the received radiation, the location of the body relative to a three-dimensional reference coordinate system comprising:
a detector array of N spaced apart radiation detector means, wherein N is at least four, said detector means being positioned in a known geometric relationship relative to the reference coordinate system, each such detector means comprising means for detecting radiation from the body and for producing a detector output signal corresponding to the radiation it receives;
time-delay means for time-delaying the detector output signals relative to one another to produce at least four time-shifted output signals each time-shifted by a respective delay time and each corresponding to the time-delayed detector output signal of an associated detector means;
multiplier circuit means including means for receiving said time-shifted output signals and for producing at least one multiplier output signal corresponding to the product of said at least four time-shifted output signals;
integrator circuit means for integrating said at least one multiplier output signal to produce a significant integrator output signal when the detector output signals have been time-delayed relative to one another to bring them into correlation;
intensity conversion means for converting signals reaching said integration circuit means into signals corresponding to the intensity of the detected radiation prior to the integration of said at least one multiplier output signal; and
means for determining the set of delay times resulting in a significant integrator output signal and for computing the three-dimensional coordinates of the body from the set of delay times resulting in a significant integrator output signal.

26. An apparatus according to claim 25 in which said time-delay circuit means comprises means for varying the effective distance between the body and the respective detector means.

27. An apparatus according to clai, 25 in which said time-delay means comprises means for moving the detectors relative to one another to thereby vary the effective distance between the body and the respective detector means.

28. An apparatus according to claim 25 in which said time-delay means comprises means for electronically delaying the detector output signals relative to one another to thereby vary the effective distance between the body and the respective detector means.

* * * * *

UNITED STATES PATENT AND TRADEMARK OFFICE
CERTIFICATE OF CORRECTION

PATENT NO. : 4,466,067
DATED : August 14, 1984
INVENTOR(S) : Peter Fontana

It is certified that error appears in the above-identified patent and that said Letters Patent are hereby corrected as shown below:

In the Specification:

Column 2, line 12, "signals" should be --signal--.
Column 2, line 48, "corrdinates" should be --coordinates--.
Column 4, line 4, "The" should be --This--.
Column 8, line 54, "$\Delta 1$" should be --$\Delta l$--.
Column 9, line 67, "ao" should be --so--.
Column 15, line 32, "filtering" should be --filter--.

In the Claims:

Column 26, line 58, "clai" should be --claim--.

Signed and Sealed this

Seventh Day of May 1985

[SEAL]

Attest:

DONALD J. QUIGG

Attesting Officer

Acting Commissioner of Patents and Trademarks